United States Patent
Patmore et al.

(10) Patent No.: US 11,251,663 B2
(45) Date of Patent: *Feb. 15, 2022

(54) POWER TRANSFER SYSTEM WITH PATIENT TRANSPORT APPARATUS AND POWER TRANSFER DEVICE TO TRANSFER POWER TO THE PATIENT TRANSPORT APPARATUS

(71) Applicant: Stryker Corporation, Kalamazoo, MI (US)

(72) Inventors: Kevin M. Patmore, Plainwell, MI (US); Christopher Ryan Sweeney, Portage, MI (US); Chad Conway Souke, Vicksburg, MI (US); Daniel V. Brosnan, Kalamazoo, MI (US); Kurosh Nahavandi, Portage, MI (US); Annie Desaulniers, Bothell, WA (US); Alexey Titov, Redmond, WA (US); Jeffrey S. Dunfee, II, Kalamazoo, MI (US); Aaron D. Furman, Kalamazoo, MI (US); Krishna S. Bhimavarapu, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,337

(22) Filed: Dec. 17, 2020

(65) Prior Publication Data

US 2021/0167640 A1 Jun. 3, 2021

Related U.S. Application Data

(63) Continuation of application No. 16/168,205, filed on Oct. 23, 2018, now Pat. No. 10,910,888.

(Continued)

(51) Int. Cl.
*H02J 50/90* (2016.01)
*A61G 7/08* (2006.01)
(Continued)

(52) U.S. Cl.
CPC ............... *H02J 50/90* (2016.02); *A61G 7/05* (2013.01); *A61G 7/0509* (2016.11);
(Continued)

(58) Field of Classification Search
CPC ........................................ H02J 50/90
(Continued)

(56) References Cited

U.S. PATENT DOCUMENTS

| 3,644,945 A | 2/1972 | Goodman et al. |
| 3,743,905 A | 7/1973 | Goodman et al. |

(Continued)

FOREIGN PATENT DOCUMENTS

| AU | 2008316723 A1 | 4/2009 |
| CA | 2187727 A1 | 4/1997 |

(Continued)

OTHER PUBLICATIONS

Colson Group USA, "EZ Wheel Brochure", 2017, 4 pages.
(Continued)

*Primary Examiner* — Joseph Chang
(74) *Attorney, Agent, or Firm* — Howard & Howard Attorneys PLLC

(57) ABSTRACT

A power transfer system comprises a patient transport apparatus and a power transfer device. The power transfer system provides convenience and ease of connection between a power source and the patient transport apparatus to provide power to one or more electrically powered devices on the patient transport apparatus or to provide energy for an energy storage device on the patient transport apparatus.

17 Claims, 34 Drawing Sheets

Related U.S. Application Data

(60) Provisional application No. 62/576,315, filed on Oct. 24, 2017.

(51) Int. Cl.
*H02J 7/02* (2016.01)
*H02J 5/00* (2016.01)
*A61G 12/00* (2006.01)
*A61G 7/05* (2006.01)
*H02S 40/22* (2014.01)
*H02J 50/10* (2016.01)
*H02J 50/60* (2016.01)
*H02J 50/40* (2016.01)
*H02J 50/12* (2016.01)

(52) U.S. Cl.
CPC .......... *A61G 7/0514* (2016.11); *A61G 7/0524* (2016.11); *A61G 7/08* (2013.01); *A61G 12/005* (2013.01); *A61G 12/007* (2013.01); *H02J 5/005* (2013.01); *H02J 7/025* (2013.01); *H02J 50/10* (2016.02); *H02J 50/402* (2020.01); *H02J 50/60* (2016.02); *H02S 40/22* (2014.12); *A61G 2203/20* (2013.01); *A61G 2203/40* (2013.01); *H02J 50/12* (2016.02)

(58) Field of Classification Search
USPC ........................................................ 307/104
See application file for complete search history.

(56) References Cited

U.S. PATENT DOCUMENTS

| | | | |
|---|---|---|---|
| 3,763,979 A | 10/1973 | Goodman et al. |
| 4,095,822 A | 6/1978 | Thornhill |
| 4,944,056 A | 7/1990 | Schroeder et al. |
| 4,961,422 A | 10/1990 | Marchosky et al. |
| 5,164,623 A | 11/1992 | Shkondin |
| 5,197,466 A | 3/1993 | Marchosky et al. |
| 5,591,217 A | 1/1997 | Barreras |
| 5,697,110 A | 12/1997 | Campbell |
| 5,708,993 A | 1/1998 | Campbell et al. |
| 5,769,877 A | 6/1998 | Barreras, Sr. |
| 5,806,110 A | 9/1998 | Kunz et al. |
| 5,806,111 A | 9/1998 | Heimbrock et al. |
| 5,807,397 A | 9/1998 | Barreras |
| 5,821,728 A | 10/1998 | Schwind |
| 5,991,665 A | 11/1999 | Wang et al. |
| 6,460,828 B1 | 10/2002 | Gersemsky et al. |
| 6,532,607 B1 | 3/2003 | Heil |
| 6,802,385 B2 | 10/2004 | Pyntikov et al. |
| 6,838,174 B2 | 1/2005 | Nakahigashi |
| 6,870,475 B2 | 3/2005 | Fitch et al. |
| 6,871,714 B2 | 3/2005 | Johnson |
| 6,966,083 B1 | 11/2005 | Cheng |
| 7,010,369 B2 | 3/2006 | Borders et al. |
| 7,154,397 B2 | 12/2006 | Zerhusen et al. |
| 7,256,705 B2 | 8/2007 | Kagermeier et al. |
| 7,321,811 B1 | 1/2008 | Rawls-Meehan |
| 7,398,571 B2 | 7/2008 | Souke et al. |
| 7,404,221 B2 | 7/2008 | Sackner |
| 7,465,280 B2 | 12/2008 | Rawls-Meehan |
| 7,528,521 B2 | 5/2009 | Naitou et al. |
| 7,530,616 B2 | 5/2009 | Pomper |
| 7,650,192 B2 | 1/2010 | Wahlstrand |
| 7,679,520 B2 | 3/2010 | Zerhusen et al. |
| 7,725,968 B2 | 6/2010 | Lambarth |
| 7,825,544 B2 | 11/2010 | Jansen et al. |
| 7,868,740 B2 | 1/2011 | McNeely et al. |
| 7,887,113 B2 | 2/2011 | Lambarth et al. |
| 7,911,349 B2 | 3/2011 | Zerhusen et al. |
| 8,000,800 B2 | 8/2011 | Takeda et al. |
| 8,006,332 B2 | 8/2011 | Lemire et al. |
| 8,019,486 B2 | 9/2011 | Rawls-Meehan |
| 8,031,057 B2 | 10/2011 | McNeely et al. |
| 8,032,263 B2 | 10/2011 | Rawls-Meehan |
| 8,035,255 B2 | 10/2011 | Kurs et al. |
| 8,046,115 B2 | 10/2011 | Rawls-Meehan |
| 8,046,116 B2 | 10/2011 | Rawls-Meehan |
| 8,046,117 B2 | 10/2011 | Rawls-Meehan |
| 8,056,163 B2 | 11/2011 | Lemire et al. |
| 8,056,950 B2 | 11/2011 | Souke et al. |
| 8,063,785 B2 | 11/2011 | Sacchetti |
| 8,069,512 B2 | 12/2011 | Rawls-Meehan |
| 8,078,336 B2 | 12/2011 | Rawls-Meehan |
| 8,078,337 B2 | 12/2011 | Rawls-Meehan |
| 8,106,539 B2 | 1/2012 | Schatz et al. |
| 8,121,856 B2 | 2/2012 | Huster et al. |
| 8,125,318 B2 | 2/2012 | Heimbrock et al. |
| 8,129,865 B2 | 3/2012 | Krumme et al. |
| 8,143,846 B2 | 3/2012 | Herman et al. |
| 8,177,274 B2 | 5/2012 | Pomper |
| 8,285,388 B2 | 10/2012 | Wahlstrand |
| 8,295,940 B2 | 10/2012 | Sherman |
| 8,304,935 B2 | 11/2012 | Karalis et al. |
| 8,324,759 B2 | 12/2012 | Karalis et al. |
| 8,334,779 B2 | 12/2012 | Zerhusen et al. |
| 8,344,860 B2 | 1/2013 | Collins, Jr. et al. |
| 8,362,742 B2 | 1/2013 | Kalimyer |
| 8,368,545 B2 | 2/2013 | Zerhusen et al. |
| 8,375,488 B2 | 2/2013 | Rawls-Meehan |
| 8,400,017 B2 | 3/2013 | Kurs et al. |
| 8,400,104 B2 | 3/2013 | Adamczyk et al. |
| 8,410,636 B2 | 4/2013 | Kurs et al. |
| 8,439,416 B2 | 5/2013 | Lambarth et al. |
| 8,441,154 B2 | 5/2013 | Karalis et al. |
| 8,447,366 B2 | 5/2013 | Ungari et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,499,384 B2 | 8/2013 | Zerhusen |
| 8,536,990 B2 | 9/2013 | Collins, Jr. et al. |
| 8,551,163 B2 | 10/2013 | Aber et al. |
| 8,554,322 B2 | 10/2013 | Olson et al. |
| 8,565,934 B2 | 10/2013 | Rawls-Meehan |
| 8,569,914 B2 | 10/2013 | Karalis et al. |
| 8,587,153 B2 | 11/2013 | Schatz et al. |
| 8,587,155 B2 | 11/2013 | Giler et al. |
| 8,604,916 B2 | 12/2013 | McNeely et al. |
| 8,604,917 B2 | 12/2013 | Collins et al. |
| 8,606,344 B2 | 12/2013 | DiMaio et al. |
| 8,618,696 B2 | 12/2013 | Kurs et al. |
| 8,626,249 B2 | 1/2014 | Ungari et al. |
| 8,629,578 B2 | 1/2014 | Kurs et al. |
| 8,634,981 B1 | 1/2014 | Hyde et al. |
| 8,641,629 B2 | 2/2014 | Kurokawa |
| 8,669,676 B2 | 3/2014 | Karalis et al. |
| 8,674,839 B2 | 3/2014 | Zerhusen et al. |
| 8,686,598 B2 | 4/2014 | Schatz et al. |
| 8,692,410 B2 | 4/2014 | Schatz et al. |
| 8,716,903 B2 | 5/2014 | Kurs et al. |
| 8,723,366 B2 | 5/2014 | Fiorello et al. |
| 8,725,262 B2 | 5/2014 | Olson et al. |
| 8,729,737 B2 | 5/2014 | Schatz et al. |
| 8,764,621 B2 | 7/2014 | Badstibner et al. |
| 8,772,973 B2 | 7/2014 | Kurs |
| 8,782,826 B2 | 7/2014 | White et al. |
| 8,799,011 B2 | 8/2014 | Wilson et al. |
| 8,847,548 B2 | 9/2014 | Kesler et al. |
| 8,862,241 B2 | 10/2014 | Forsell |
| 8,864,205 B2 | 10/2014 | Lemire et al. |
| 8,866,598 B2 | 10/2014 | Collins, Jr. et al. |
| 8,869,328 B2 | 10/2014 | Rawls-Meehan |
| 8,886,333 B2 | 11/2014 | Lui et al. |
| 8,886,383 B2 | 11/2014 | Hyde et al. |
| 8,887,619 B2 | 11/2014 | Kallmyer et al. |
| 8,890,470 B2 | 11/2014 | Partovi |

(56) References Cited

U.S. PATENT DOCUMENTS

| | | |
|---|---|---|
| 8,896,264 B2 | 11/2014 | Partovi |
| 8,901,778 B2 | 12/2014 | Kesler et al. |
| 8,901,779 B2 | 12/2014 | Kesler et al. |
| 8,901,881 B2 | 12/2014 | Partovi |
| 8,907,531 B2 | 12/2014 | Hall et al. |
| 8,909,378 B2 | 12/2014 | Rawls-Meehan |
| 8,912,687 B2 | 12/2014 | Kesler et al. |
| 8,917,166 B2 | 12/2014 | Collins, Jr. et al. |
| 8,928,276 B2 | 1/2015 | Kesler et al. |
| 8,933,594 B2 | 1/2015 | Kurs et al. |
| 8,937,408 B2 | 1/2015 | Ganem et al. |
| 8,946,938 B2 | 2/2015 | Kesler et al. |
| 8,963,488 B2 | 2/2015 | Campanella et al. |
| 8,973,963 B2 | 3/2015 | Lambarth et al. |
| 8,984,685 B2 | 3/2015 | Robertson et al. |
| 9,002,469 B2 | 4/2015 | D'Ambrosio |
| 9,038,218 B1 | 5/2015 | Heil et al. |
| 9,044,365 B2 | 6/2015 | Rawls-Meehan |
| 9,044,366 B2 | 6/2015 | Rawls-Meehan |
| 9,050,031 B2 | 6/2015 | Collins, Jr. et al. |
| 9,052,718 B2 | 6/2015 | Hyde et al. |
| 9,059,599 B2 | 6/2015 | Won et al. |
| 9,079,043 B2 | 7/2015 | Stark et al. |
| 9,089,462 B1 | 7/2015 | Lafleche |
| 9,093,853 B2 | 7/2015 | Schatz et al. |
| 9,101,521 B2 | 8/2015 | White et al. |
| 9,105,959 B2 | 8/2015 | Kesler et al. |
| 9,106,203 B2 | 8/2015 | Kesler et al. |
| 9,107,783 B2 | 8/2015 | Childs et al. |
| 9,108,063 B2 | 8/2015 | Olson et al. |
| 9,114,050 B2 | 8/2015 | White et al. |
| 9,125,779 B2 | 9/2015 | Hyde et al. |
| 9,132,051 B2 | 9/2015 | Heil |
| 9,149,126 B2 | 10/2015 | Rawls-Meehan |
| 9,160,203 B2 | 10/2015 | Fiorello et al. |
| 9,161,633 B2 | 10/2015 | Rawls-Meehan |
| 9,173,793 B2 | 11/2015 | Rawls-Meehan |
| 9,173,794 B2 | 11/2015 | Rawls-Meehan |
| 9,182,750 B2 | 11/2015 | Rawls-Meehan |
| 9,184,595 B2 | 11/2015 | Kurs et al. |
| 9,218,454 B2 | 12/2015 | Kiani et al. |
| 9,220,651 B2 | 12/2015 | Hyde et al. |
| 9,233,039 B2 | 1/2016 | Hyde et al. |
| 9,237,814 B2 | 1/2016 | Rawls-Meehan |
| 9,241,858 B2 | 1/2016 | Hyde et al. |
| 9,246,336 B2 | 1/2016 | Kurs et al. |
| 9,259,369 B2 | 2/2016 | Derenne et al. |
| 9,270,134 B2 | 2/2016 | Gaddam et al. |
| 9,278,036 B2 | 3/2016 | Lee |
| 9,281,701 B2 | 3/2016 | Large et al. |
| 9,286,441 B2 | 3/2016 | Zerhusen et al. |
| 9,289,336 B2 | 3/2016 | Lambarth et al. |
| 9,295,849 B2 | 3/2016 | Elghazzawi et al. |
| 9,306,322 B2 | 4/2016 | Bhimavarapu et al. |
| 9,308,303 B2 | 4/2016 | Badstibner et al. |
| 9,314,105 B2 | 4/2016 | Ralws-Meehan |
| 9,314,928 B2 | 4/2016 | Hyde et al. |
| 9,314,929 B2 | 4/2016 | Hyde et al. |
| 9,333,136 B2 | 5/2016 | Gibson et al. |
| 9,336,672 B2 | 5/2016 | Collins, Jr. et al. |
| 9,364,625 B2 | 6/2016 | Silver et al. |
| 9,369,182 B2 | 6/2016 | Kurs et al. |
| 9,375,374 B2 | 6/2016 | Herman et al. |
| 9,381,125 B2 | 7/2016 | Herbst et al. |
| 9,392,875 B2 | 7/2016 | Weyl |
| 9,397,518 B1 | 7/2016 | Theobald |
| 9,407,110 B2 | 8/2016 | Lui et al. |
| 9,425,640 B2 | 8/2016 | Moran |
| 9,427,367 B2 | 8/2016 | White et al. |
| 9,433,546 B2 | 9/2016 | Rawls-Meehan et al. |
| 9,444,520 B2 | 9/2016 | Hall et al. |
| 9,451,833 B2 | 9/2016 | Rawls-Meehan |
| 9,456,939 B2 | 10/2016 | Lambarth et al. |
| 9,463,126 B2 | 10/2016 | Zerhusen et al. |
| 9,463,324 B2 | 10/2016 | Olson et al. |
| 9,465,915 B2 | 10/2016 | McNeely et al. |
| 9,492,339 B2 | 11/2016 | Leib |
| 9,496,719 B2 | 11/2016 | Kesler et al. |
| 9,513,899 B2 | 12/2016 | Collins, Jr. et al. |
| 9,515,494 B2 | 12/2016 | Kurs et al. |
| 9,515,495 B2 | 12/2016 | Kurs et al. |
| 9,517,034 B2 | 12/2016 | Collins, Jr. et al. |
| 9,526,346 B2 | 12/2016 | Rawls-Meehan |
| 9,526,665 B2 | 12/2016 | Rawls-Meehan et al. |
| 9,527,699 B2 | 12/2016 | Liljedahl |
| 9,537,344 B2 | 1/2017 | Thompson et al. |
| 9,560,787 B2 | 1/2017 | Kallmyer et al. |
| 9,577,436 B2 | 2/2017 | Kesler et al. |
| 9,584,189 B2 | 2/2017 | Kurs et al. |
| 9,596,005 B2 | 3/2017 | Kurs et al. |
| 9,601,261 B2 | 3/2017 | Schatz et al. |
| 9,601,270 B2 | 3/2017 | Kurs et al. |
| 9,615,983 B2 | 4/2017 | Stryker et al. |
| 9,734,293 B2 | 8/2017 | Collins, Jr. et al. |
| 9,768,645 B2 | 9/2017 | Tetu et al. |
| 10,004,651 B2 | 6/2018 | DeLuca et al. |
| 10,910,888 B2 * | 2/2021 | Patmore ............ H02J 7/0044 |
| 2003/0079923 A1 | 5/2003 | Johnson |
| 2004/0083394 A1 | 4/2004 | Brebner et al. |
| 2005/0155149 A1 | 7/2005 | Pedersen |
| 2006/0059623 A1 | 3/2006 | Karmer et al. |
| 2006/0108977 A1 | 5/2006 | Kagermeier et al. |
| 2006/0249320 A1 | 11/2006 | Carter et al. |
| 2007/0211866 A1 | 9/2007 | Sink |
| 2007/0219950 A1 | 9/2007 | Crawford |
| 2007/0299473 A1 | 12/2007 | Matos |
| 2008/0041282 A1 | 2/2008 | Goschy et al. |
| 2008/0086817 A1 | 4/2008 | Zucker et al. |
| 2008/0295595 A1 | 12/2008 | Tacklind et al. |
| 2009/0121660 A1 | 5/2009 | Rawls-Meehan |
| 2010/0045146 A1 | 2/2010 | Thorne |
| 2010/0277121 A1 | 11/2010 | Hall et al. |
| 2010/0314946 A1 | 12/2010 | Budde et al. |
| 2010/0328044 A1 | 12/2010 | Waffenschmidt et al. |
| 2011/0011878 A1 | 1/2011 | Baer et al. |
| 2011/0043049 A1 | 2/2011 | Karalis et al. |
| 2011/0117529 A1 | 5/2011 | Barash et al. |
| 2011/0162067 A1 | 6/2011 | Shuart et al. |
| 2011/0208074 A1 | 8/2011 | Anderson |
| 2011/0247134 A1 | 10/2011 | Howell et al. |
| 2011/0247137 A1 | 10/2011 | Herman et al. |
| 2011/0278948 A1 | 11/2011 | Forsell |
| 2011/0298420 A1 | 12/2011 | Forsberg et al. |
| 2012/0056729 A1 | 3/2012 | Rawls-Meehan |
| 2012/0057685 A1 | 3/2012 | Rawls-Meehan |
| 2012/0069961 A1 | 3/2012 | Pomper et al. |
| 2012/0084920 A1 | 4/2012 | Zucker et al. |
| 2012/0086284 A1 | 4/2012 | Capanella et al. |
| 2012/0091794 A1 | 4/2012 | Campanella et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0110738 A1 | 5/2012 | Rawls-Meehan |
| 2012/0110824 A1 | 5/2012 | Smith et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0117730 A1 | 5/2012 | Lemire et al. |
| 2012/0119569 A1 | 5/2012 | Karalis et al. |
| 2012/0119698 A1 | 5/2012 | Karalis et al. |
| 2012/0123242 A1 | 5/2012 | Stilley et al. |
| 2012/0139355 A1 | 6/2012 | Ganem et al. |
| 2012/0228952 A1 | 9/2012 | Hall et al. |
| 2012/0235501 A1 | 9/2012 | Kesler et al. |
| 2012/0235502 A1 | 9/2012 | Kesler et al. |
| 2012/0235504 A1 | 9/2012 | Kesler et al. |
| 2012/0235566 A1 | 9/2012 | Karalis et al. |
| 2012/0242159 A1 | 9/2012 | Lou et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |

(56) References Cited

U.S. PATENT DOCUMENTS

| | | |
|---|---|---|
| 2012/0312196 A1 | 12/2012 | Newkirk |
| 2012/0326660 A1 | 12/2012 | Lu et al. |
| 2013/0106347 A1 | 5/2013 | Kallmyer et al. |
| 2013/0109973 A1 | 5/2013 | Kurokawa |
| 2013/0191992 A1 | 8/2013 | Rawls-Meehan |
| 2014/0004814 A1 | 1/2014 | Elghazzawi |
| 2014/0031883 A1 | 1/2014 | Elghazzawi |
| 2014/0039351 A1 | 2/2014 | Mix et al. |
| 2014/0045367 A1 | 2/2014 | Christie et al. |
| 2014/0057235 A1 | 2/2014 | Kellum et al. |
| 2014/0090173 A1 | 4/2014 | DiMaio et al. |
| 2014/0139405 A1 | 5/2014 | Ribble et al. |
| 2014/0145915 A1 | 5/2014 | Ribble et al. |
| 2014/0195057 A1 | 7/2014 | Zerhusen et al. |
| 2014/0259414 A1 | 9/2014 | Hayes et al. |
| 2014/0285016 A1 | 9/2014 | Tetu et al. |
| 2014/0312706 A1 | 10/2014 | Fiorello et al. |
| 2014/0312707 A1 | 10/2014 | Fiorello et al. |
| 2014/0327320 A1 | 11/2014 | Muhs et al. |
| 2014/0343968 A1 | 11/2014 | Wilson et al. |
| 2015/0069831 A1 | 3/2015 | Kesler et al. |
| 2015/0075575 A1 | 3/2015 | Karlovich |
| 2015/0088129 A1 | 3/2015 | Ganem et al. |
| 2015/0107020 A1 | 4/2015 | Andersson et al. |
| 2015/0115638 A1 | 4/2015 | Lambarth et al. |
| 2015/0123484 A1 | 5/2015 | Kurs et al. |
| 2015/0128353 A1 | 5/2015 | Kildey |
| 2015/0128354 A1 | 5/2015 | Greenstein et al. |
| 2015/0130412 A1 | 5/2015 | Partovi |
| 2015/0130586 A1 | 5/2015 | Rawls-Meehan |
| 2015/0135436 A1 | 5/2015 | Stryker et al. |
| 2015/0207351 A1 | 7/2015 | Hamburgen et al. |
| 2015/0216749 A1 | 8/2015 | Heil et al. |
| 2015/0251322 A1 | 9/2015 | Goodwin et al. |
| 2015/0252940 A1 | 9/2015 | Goodwin et al. |
| 2015/0255994 A1 | 9/2015 | Kesler et al. |
| 2015/0290061 A1 | 10/2015 | Stafford et al. |
| 2015/0296550 A1 | 10/2015 | Shelly et al. |
| 2015/0297427 A1 | 10/2015 | Lambarth et al. |
| 2015/0297439 A1 | 10/2015 | Karlovich |
| 2015/0335506 A9 | 11/2015 | Kildey |
| 2015/0342806 A1 | 12/2015 | Hyde et al. |
| 2015/0351981 A1 | 12/2015 | Sazonov |
| 2015/0351982 A1 | 12/2015 | Krenik |
| 2015/0357831 A1 | 12/2015 | Fiorello et al. |
| 2015/0362333 A1 | 12/2015 | Miller et al. |
| 2015/0365138 A1 | 12/2015 | Miller et al. |
| 2016/0000622 A1 | 1/2016 | Rawls-Meehan |
| 2016/0013837 A1 | 1/2016 | Howell et al. |
| 2016/0022218 A1 | 1/2016 | Hayes et al. |
| 2016/0028243 A1 | 1/2016 | Schatz et al. |
| 2016/0043571 A1 | 2/2016 | Kesler et al. |
| 2016/0052129 A1 | 2/2016 | Ekas |
| 2016/0052137 A1 | 2/2016 | Hyde et al. |
| 2016/0052138 A1 | 2/2016 | Hyde et al. |
| 2016/0052139 A1 | 2/2016 | Hyde et al. |
| 2016/0067396 A1 | 3/2016 | Stark et al. |
| 2016/0070267 A1 | 3/2016 | Hyde et al. |
| 2016/0075177 A1 | 3/2016 | Biderman et al. |
| 2016/0089283 A1 | 3/2016 | DeLuca et al. |
| 2016/0117450 A1 | 4/2016 | Zerhusen et al. |
| 2016/0120722 A1 | 5/2016 | Mueller |
| 2016/0120740 A1 | 5/2016 | Rawls-Meehan |
| 2016/0128468 A1 | 5/2016 | Lafleche et al. |
| 2016/0136018 A1 | 5/2016 | DeLuca et al. |
| 2016/0149425 A1 | 5/2016 | Hsu |
| 2016/0158082 A1 | 6/2016 | Gainor et al. |
| 2016/0158083 A1 | 6/2016 | Lambarth et al. |
| 2016/0175602 A1 | 6/2016 | Aoyama et al. |
| 2016/0193397 A9 | 7/2016 | Aber et al. |
| 2016/0199983 A1 | 7/2016 | Hyde et al. |
| 2016/0211695 A1 | 7/2016 | Singer |
| 2016/0213537 A1 | 7/2016 | Hayes et al. |
| 2016/0242558 A1 | 8/2016 | Rawls-Meehan et al. |
| 2016/0242681 A1 | 8/2016 | Shen et al. |
| 2016/0256080 A1 | 9/2016 | Shen et al. |
| 2016/0275776 A1 | 9/2016 | Shen et al. |
| 2016/0301253 A1 | 10/2016 | Kurs et al. |
| 2016/0306762 A1 | 10/2016 | Lee et al. |
| 2016/0330402 A1 | 11/2016 | Benetti et al. |
| 2016/0336812 A1 | 11/2016 | Fiorello et al. |
| 2016/0338891 A1 | 11/2016 | Agdeppa et al. |
| 2016/0362015 A1 | 12/2016 | Fiorello et al. |
| 2016/0367415 A1 | 12/2016 | Hayes et al. |
| 2016/0367420 A1 | 12/2016 | Zerhusen et al. |
| 2016/0374884 A1 | 12/2016 | Blickensderfer et al. |
| 2016/0380488 A1 | 12/2016 | Widmer et al. |
| 2017/0011181 A1 | 1/2017 | McNeely et al. |
| 2017/0020440 A1 | 1/2017 | Flitsch et al. |
| 2017/0027789 A1 | 2/2017 | St.John et al. |
| 2017/0035295 A1 | 2/2017 | Collins, Jr. et al. |
| 2017/0035370 A1 | 2/2017 | Collins, Jr. et al. |
| 2017/0047762 A1 | 2/2017 | Tuseth et al. |
| 2017/0053736 A9 | 2/2017 | Hall et al. |
| 2017/0053737 A1 | 2/2017 | Kurs |
| 2017/0054319 A1 | 2/2017 | Kesler et al. |
| 2017/0055882 A1 | 3/2017 | Al-Ali et al. |
| 2017/0055887 A1 | 3/2017 | Al-Ali |
| 2017/0062124 A9 | 3/2017 | Hall et al. |
| 2017/0063143 A1 | 3/2017 | Hoarau et al. |
| 2017/0065766 A1 | 3/2017 | Olson et al. |
| 2017/0098044 A1 | 4/2017 | Lai et al. |
| 2017/0119607 A1 | 5/2017 | Derenne et al. |
| 2017/0281440 A1 | 10/2017 | Puvogel et al. |
| 2019/0123597 A1 | 4/2019 | Patmore et al. |
| 2019/0123598 A1 | 4/2019 | Patmore et al. |

FOREIGN PATENT DOCUMENTS

| | | |
|---|---|---|
| CN | 104097531 A | 10/2014 |
| EP | 0315210 B1 | 7/1994 |
| EP | 0700574 B1 | 7/1997 |
| WO | 8903665 A1 | 5/1989 |
| WO | 9100054 A1 | 1/1991 |
| WO | 9428560 A1 | 12/1994 |
| WO | 9620754 A1 | 7/1996 |
| WO | 2004038890 A1 | 5/2004 |
| WO | 2005016216 A2 | 2/2005 |
| WO | 2005077102 A2 | 8/2005 |
| WO | 2007063500 A2 | 6/2007 |
| WO | 2007064609 A1 | 6/2007 |
| WO | 2007118221 A2 | 10/2007 |
| WO | 2007136733 A2 | 11/2007 |
| WO | 2008003027 A2 | 1/2008 |
| WO | 2008036087 A1 | 3/2008 |
| WO | 2008050260 A1 | 5/2008 |
| WO | 2008050292 A2 | 5/2008 |
| WO | 2008055664 A2 | 5/2008 |
| WO | 2008150448 A1 | 12/2008 |
| WO | 2009009296 A3 | 3/2009 |
| WO | 2009055203 A1 | 4/2009 |
| WO | 2009055432 A2 | 4/2009 |
| WO | 2009120970 A2 | 10/2009 |
| WO | 2009123780 A1 | 10/2009 |
| WO | 2009135081 A2 | 11/2009 |
| WO | 2010027282 A2 | 3/2010 |
| WO | 2010036980 A1 | 4/2010 |
| WO | 2010059096 A1 | 5/2010 |
| WO | 2010059097 A1 | 5/2010 |
| WO | 2010093997 A1 | 8/2010 |
| WO | 201109611 A1 | 8/2011 |
| WO | 2011113070 A1 | 9/2011 |
| WO | 2011156768 A2 | 12/2011 |
| WO | 2012087807 A2 | 6/2012 |
| WO | 2012100219 A1 | 7/2012 |
| WO | 2012122002 A1 | 9/2012 |
| WO | 2012135118 A1 | 10/2012 |
| WO | 2012170278 A2 | 12/2012 |
| WO | 2013006845 A2 | 1/2013 |
| WO | 2013009881 A2 | 1/2013 |
| WO | 2013049979 A1 | 4/2013 |
| WO | 2013050699 A1 | 4/2013 |
| WO | 2013044165 A3 | 5/2013 |
| WO | 2013062808 A1 | 5/2013 |

(56) References Cited

FOREIGN PATENT DOCUMENTS

| | | |
|---|---|---|
| WO | 2013062809 A2 | 5/2013 |
| WO | 2013072306 A1 | 5/2013 |
| WO | 2013074452 A2 | 5/2013 |
| WO | 2013078092 A1 | 5/2013 |
| WO | 2013112782 A2 | 8/2013 |
| WO | 2013123119 A1 | 8/2013 |
| WO | 2013131078 A1 | 9/2013 |
| WO | 2013142840 A1 | 9/2013 |
| WO | 2013156907 A2 | 10/2013 |
| WO | 2013158675 A1 | 10/2013 |
| WO | 2014014581 A2 | 1/2014 |
| WO | 2014043659 A1 | 3/2014 |
| WO | 2014046844 A1 | 3/2014 |
| WO | 2014052147 A2 | 4/2014 |
| WO | 2014052148 A2 | 4/2014 |
| WO | 2014078667 A1 | 5/2014 |
| WO | 2014097055 A1 | 6/2014 |
| WO | 2014113164 A1 | 7/2014 |
| WO | 2014150970 A1 | 9/2014 |
| WO | 2014151577 A1 | 9/2014 |
| WO | 2014164248 A1 | 10/2014 |
| WO | 2015010702 A1 | 1/2015 |
| WO | 2015106239 A1 | 7/2015 |
| WO | 2015108653 A1 | 7/2015 |
| WO | 2015148578 A2 | 10/2015 |
| WO | 2015191819 A1 | 12/2015 |
| WO | 2016090384 A2 | 6/2016 |
| WO | 2016167594 A1 | 10/2016 |
| WO | 2016179562 A1 | 11/2016 |
| WO | 2017025735 A1 | 2/2017 |
| WO | 2017040317 A1 | 3/2017 |

OTHER PUBLICATIONS

Daily Mail Reporter, "Move over Fred Flintstone: The human-powered car that can reach speeds of up to 60mph", http://www.dailymail.co.uk/motoring/article-1304120/The-human-powered-car-reach-speeds-60mph.html, Aug. 19, 2010, 5 Pages.

English language abstract and machine-assisted English translation for CN 104097531 extracted from espacenet.com database on Jan. 10, 2019, 6 pages.

English language abstract and machine-assisted English translation for WO 2013/072306 extracted from espacenet.com database on Jan. 10, 2019, 14 pages.

English language abstract and machine-assisted English translation for WO 91/00054 extracted from espacenet.com database on Jan. 14, 2019, 11 pages.

English language abstract for WO 2008/055664 extracted from espacenet.com database on Jan. 14, 2019, 2 pages.

English language abstract for WO 2011/096111 and machine-assisted English translation for CN 102812617, an equivalent of WO 2011/096111, extracted from espacenet.com database on Jan. 10, 2019, 22 pages.

English language abstract for WO 2013/049979 extracted from espacenet.com database on Jan. 10, 2019, 1 page.

English language abstract for WO 2013/050699 extracted from espacenet.com database on Jan. 14, 2019, 1 page.

English language abstract not found for AU 2008316723; however, see English language equivalent U.S. Pat. No. 9,734,293. Original document extracted from espacenet.com databasse on Jan. 10, 2019, 1 page.

EZ-WHEEL, "La Premiere Roue Eiectrique Autonome—Integrant Moteur and Batteries Brochure", http://www.ez-wheel.com, 2017, 8 pages.

Stryker SA, "Prime TC Transport Chair Brochure", 2013, 8 pages.

U.S. Appl. No. 16/168,089, filed Oct. 23, 2018.

Youtube "Tesla Charging Snake Video", Aug. 6, 2015, https://www.youtube.com/watch?v=ut3sELMOyTM, 3 pages.

* cited by examiner

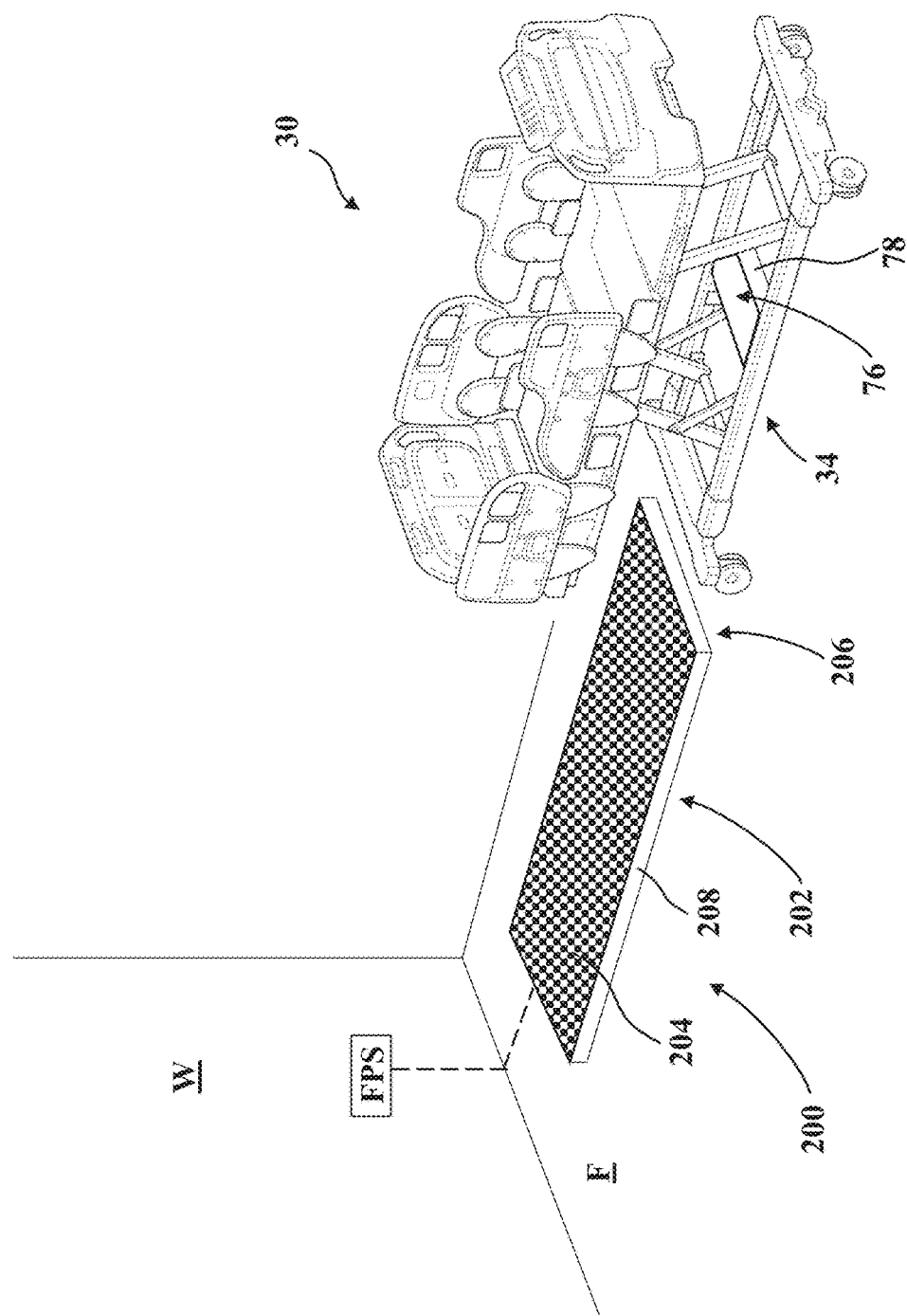

ial Patent Application No. 62/576,315 filed on Oct. 24, 2017, the disclosures of each of which are hereby incorporated by reference in their entirety.

BACKGROUND

Patient transport apparatuses, such as hospital beds, stretchers, cots, tables, wheelchairs, and chairs facilitate care of patients in a health care setting. Conventional patient transport apparatuses comprise several electrically powered devices to carry out desired functions in caring for the patient. When the patient transport apparatus is located in a patient room, for instance, the patient transport apparatus is connected to a fixed power source, such as conventional wall outlet power, to provide energy to these electrically powered devices. Usually, a power cord is required to connect the patient transport apparatus to the wall outlet power. The patient transport apparatus also typically carries one or more batteries to provide energy to the electrically powered devices when the patient transport apparatus is unable to connect to the wall outlet power, such as during transport or when located outside of the patient room.

Patient care increasingly demands more and more attention from caregivers and any activities that distract the caregiver from the patient are undesirable—one such activity is plugging the power cord from the patient transport apparatus into the wall outlet power. Wireless power transfer methods have been suggested to simplify connecting to a power source. However, owing to the large (and often unwieldy) nature of many patient transport apparatuses, caregivers will likely have trouble aligning a wireless power receiver on the patient transport apparatus with a wireless power transmitter located in the patient's room. For instance, the caregiver may not have good line-of-sight to both the wireless power transmitter and the wireless power receiver and may be unable to visualize when alignment is achieved. Good alignment may be desirable to ensure efficient power transfer.

A power transfer system with a patient transport apparatus and power transfer device designed to overcome one or more of the aforementioned disadvantages is desired.

BRIEF DESCRIPTION OF THE DRAWINGS

FIG. 9A is a perspective view of an alternative power transfer device with an integrated alignment system.

DETAILED DESCRIPTION

Figure 1:
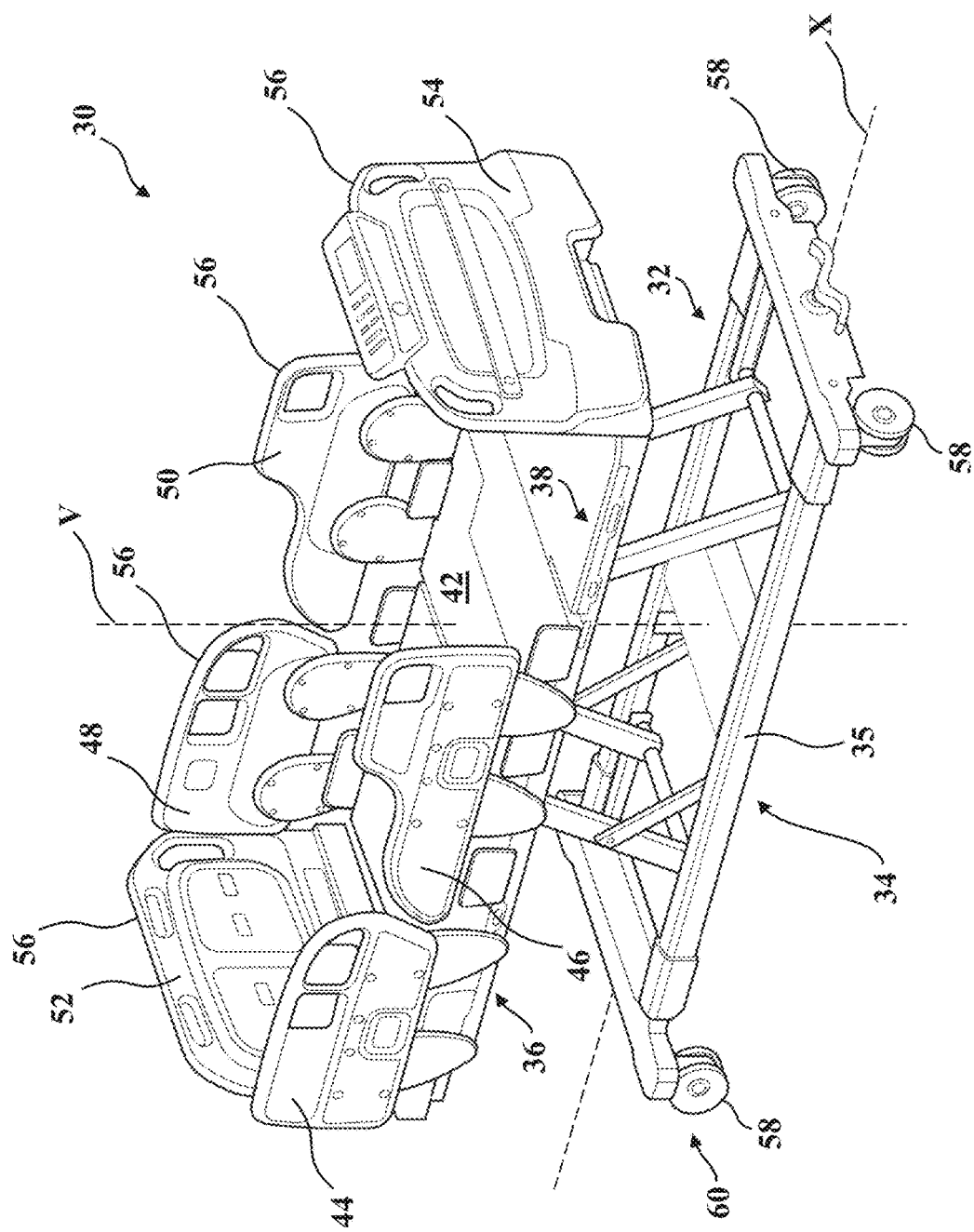
FIG. 1 is perspective view of a patient transport apparatus with a power receiver assembly mounted to a base.

Referring to FIG. 1, a patient transport apparatus 30 is shown for supporting a patient in a health care setting. The patient transport apparatus 30 illustrated in FIG. 1 comprises a hospital bed. In other embodiments, however, the patient transport apparatus 30 may comprise a stretcher, cot, table, wheelchair, chair, or similar apparatus utilized in the care of a patient.

A support structure 32 provides support for the patient. The support structure 32 illustrated in FIG. 1 comprises a base 34 and a support frame 36. The base 34 comprises a base frame 35. The support frame 36 is spaced above the base frame 35 in FIG. 1. The support structure 32 also comprises a patient support deck 38 disposed on the support frame 36. The patient support deck 38 comprises several sections, some of which are capable of articulating (e.g., pivoting) relative to the support frame 36, such as a fowler section, a seat section, a thigh section, and a foot section. The patient support deck 38 provides a patient support surface 42 upon which the patient is supported.

A mattress (not shown) is disposed on the patient support deck 38 during use. The mattress comprises a secondary patient support surface upon which the patient is supported. The base 34, support frame 36, patient support deck 38, and patient support surfaces 42 each have a head end and a foot end corresponding to designated placement of the patient's head and feet on the patient transport apparatus 30. The base 34 comprises a longitudinal axis X along its length from the head end to the foot end. The base 34 also comprises a vertical axis V arranged crosswise (e.g., perpendicularly) to the longitudinal axis X along which the support frame 36 is lifted and lowered relative to the base 34. The construction of the support structure 32 may take on any known or conventional design, and is not limited to that specifically set forth above. In addition, the mattress may be omitted in certain embodiments, such that the patient rests directly on the patient support surface 42.

Side rails 44, 46, 48, 50 are coupled to the support frame 36 and thereby supported by the base 34. A first side rail 44 is positioned at a right head end of the support frame 36. A second side rail 46 is positioned at a right foot end of the support frame 36. A third side rail 48 is positioned at a left head end of the support frame 36. A fourth side rail 50 is positioned at a left foot end of the support frame 36. If the patient transport apparatus 30 is a stretcher or a cot, there may be fewer side rails. The side rails 44, 46, 48, 50 are movable between a raised position in which they block ingress and egress into and out of the patient transport apparatus 30, one or more intermediate positions, and a lowered position in which they are not an obstacle to such ingress and egress. In still other configurations, the patient transport apparatus 30 may not include any side rails.

A headboard 52 and a footboard 54 are coupled to the support frame 36. In other embodiments, when the headboard 52 and footboard 54 are included, the headboard 52 and footboard 54 may be coupled to other locations on the patient transport apparatus 30, such as the base 34. In still other embodiments, the patient transport apparatus 30 does not include the headboard 52 and/or the footboard 54.

Caregiver interfaces 56, such as handles, are shown integrated into the footboard 54 and side rails 44, 46, 48, 50 to facilitate movement of the patient transport apparatus 30 over floor surfaces. Additional caregiver interfaces 56 may be integrated into the headboard 52 and/or other components of the patient transport apparatus 30. The caregiver interfaces 56 are graspable by the caregiver to manipulate the patient transport apparatus 30 for movement.

Other forms of the caregiver interface 56 are also contemplated. The caregiver interface may comprise one or more handles coupled to the support frame 36. The caregiver interface may simply be a surface on the patient transport apparatus 30 upon which the caregiver logically applies force to cause movement of the patient transport apparatus 30 in one or more directions, also referred to as a push location. This may comprise one or more surfaces on the support frame 36 or base 34. This could also comprise one or more surfaces on or adjacent to the headboard 52, footboard 54, and/or side rails 44, 46, 48, 50. In other embodiments, the caregiver interface may comprise separate handles for each hand of the caregiver. For example, the caregiver interface may comprise two handles.

Wheels 58 are coupled to the base 34 to facilitate transport over the floor surfaces. The wheels 58 are arranged in each of four quadrants of the base 34 adjacent to corners of the base 34. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient transport apparatus 30 may comprise four non-powered, non-steerable wheels, along with one or more powered wheels. In some cases, the patient transport apparatus 30 may not include any wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

The patient transport apparatus 30 comprises one or more electrically powered devices PD (see FIG. 5) that are employed to perform one or more functions of the patient transport apparatus 30 in caring for the patient. Such powered devices PD may comprise, for example, electric actuators, electric motors, electronic displays, electronic user interfaces, electronic therapy devices, communication devices, lighting systems, and the like. When the patient transport apparatus 30 is stationary for long periods of time, such as when the patient transport apparatus 30 is located in a patient room, a fixed power source FPS may be employed to provide energy to the powered devices PD. The fixed power source FPS may be conventional facility power routed throughout a facility, such as a hospital. An energy storage device B (see FIG. 5) is located on the patient transport apparatus 30 to store energy utilized to power these powered devices PD, particularly when the patient transport apparatus 30 is being transported away from the patient room. The energy storage device B may comprise batteries, capacitors, and the like. The energy storage device B requires charging from time-to-time via the fixed power source FPS, as described further below.

Figure 2:
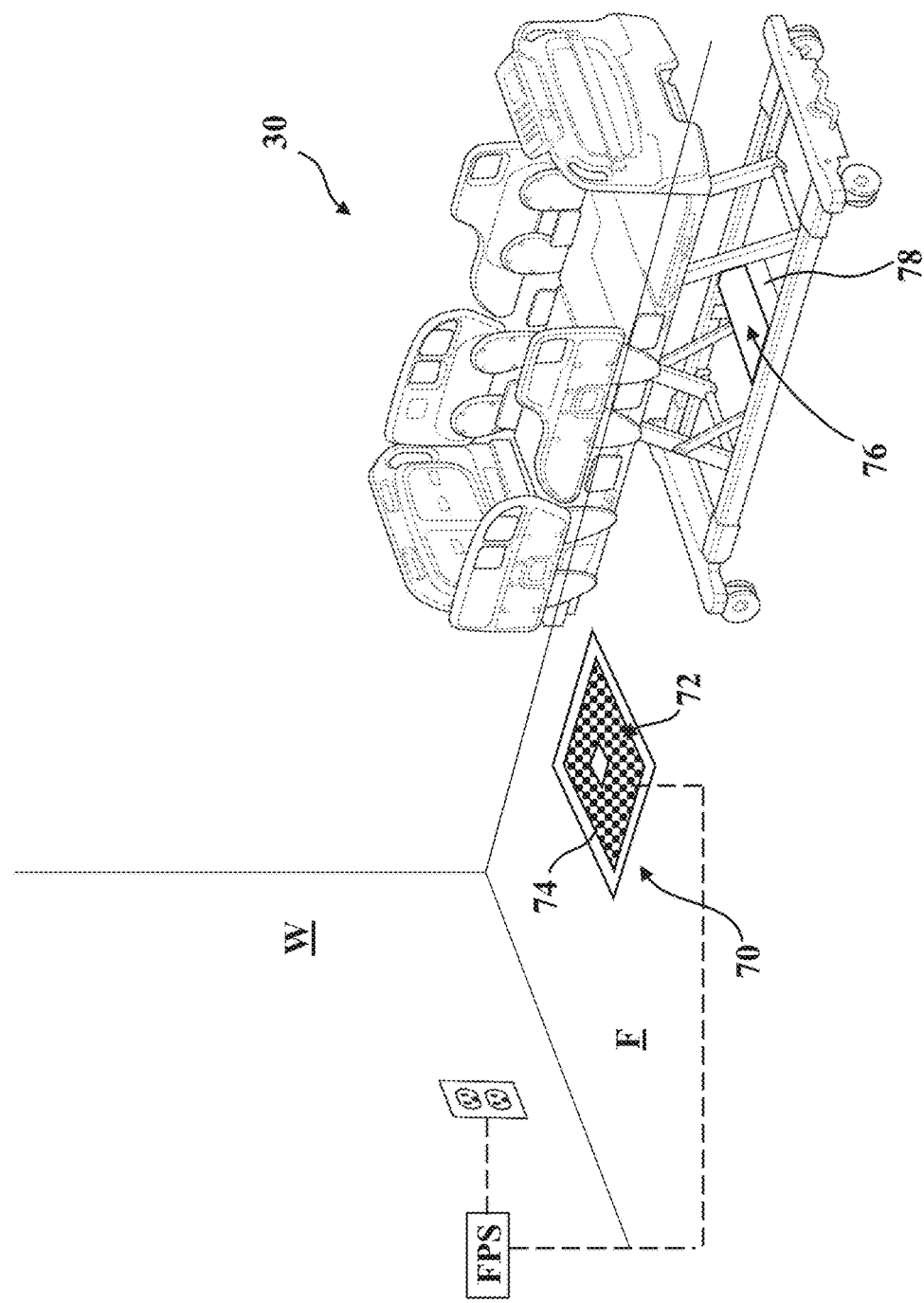
FIG. 2 is an illustration of the patient transport apparatus in relation to a power transfer device located in a floor.
Figure 3:
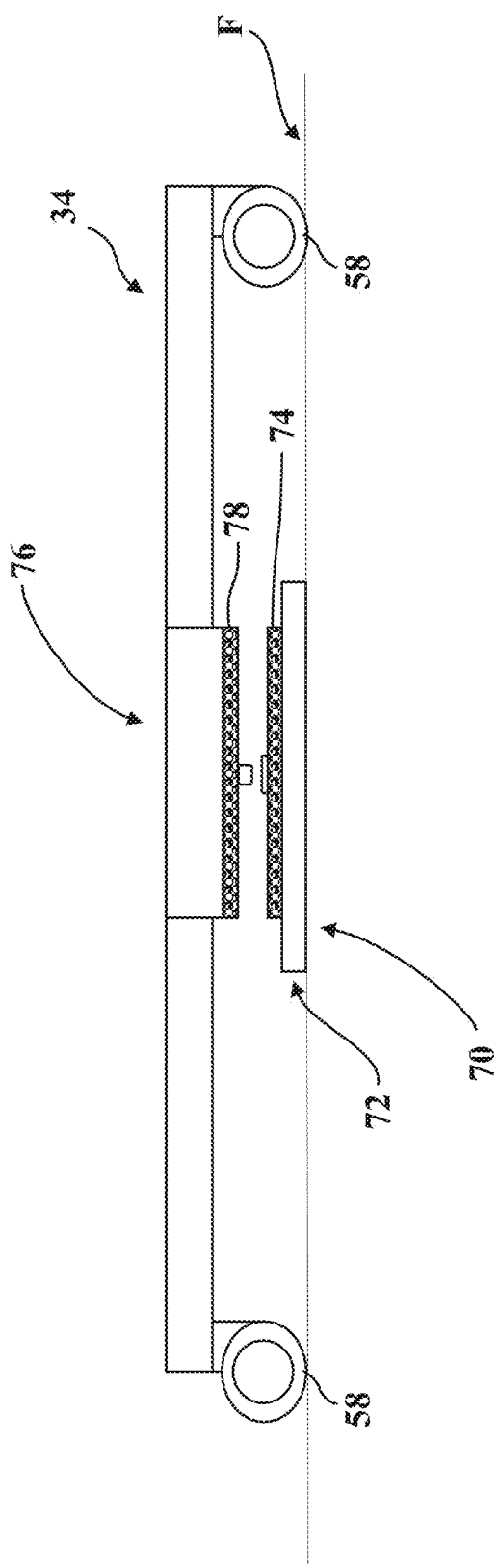
FIG. 3 is a side elevational view of the power receiver assembly of the patient transport apparatus and a power transmitter assembly of the power transfer device.

As shown in FIG. 2, a power transfer system transfers energy from the fixed power source FPS to the patient transport apparatus 30. The power transfer system comprises a power transfer device 70 provided to transfer power to a power receiver assembly 76 on the patient transport apparatus 30. Referring to FIG. 3, the power transfer device 70 comprises a power transmitter assembly 72 with a power transmitter 74 configured to transfer power to the power receiver assembly 76. The power receiver assembly 76 comprises a power receiver 78. The power transmitter 74 is coupled to the fixed power source FPS and the power receiver 78 is coupled to the powered devices PD and the energy storage device B on the patient transport apparatus 30 (see FIG. 5). In one embodiment, the power transmitter 74 is configured to transfer power wirelessly to the power receiver 78, such as through inductive coupling.

The power transmitter 74 may comprise one or more coils and the power receiver 78 may comprise one or more coils. The coils of the power transmitter 74 create a magnetic field that, when the coils of the power receiver 78 are positioned nearby, creates electrical current within the coils of the power receiver 78 and within any electrical connections to the power receiver 78. The patient transport apparatus 30 harnesses the electrical energy inductively generated within the coils of the power receiver 78 for providing electrical power to the electrically powered devices PD directly or indirectly, such as through the energy storage device B. Various sizes, shapes, and types of coils of the power transmitter 74 and/or the power receiver 78 are contemplated.

Figure 4:
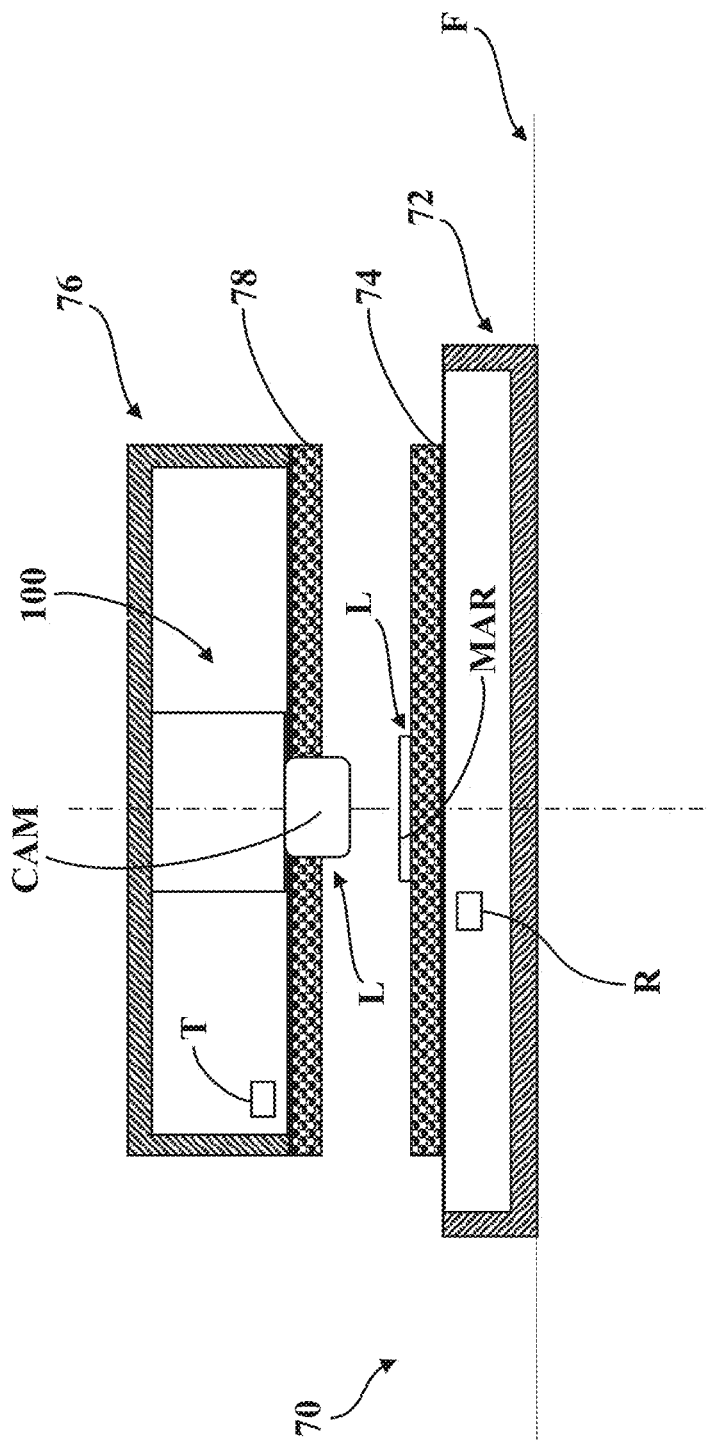
FIG. 4 is a partial sectional view of the power transmitter assembly and the power receiver assembly.

In the embodiment shown in FIGS. 3 and 4, the power receiver 78 is coupled to the base 34 of the support structure 32. However, the power receiver 78 may be located at any suitable location on the patient transport apparatus 30. In other embodiments, the power receiver 78 is mounted to the support frame 36. The power transfer device 70 is located on the floor surface F in FIG. 3 and may be in the form of a mat as shown, or may be integrated into the floor. The power transfer device 70 may be located at any suitable location to transfer power to the power receiver 78. In other embodiments, the power transfer device 70 is located adjacent to a wall surface W and may be embodied in a pad attached to the wall surface W, or may be integrated into the wall.

Figure 5:
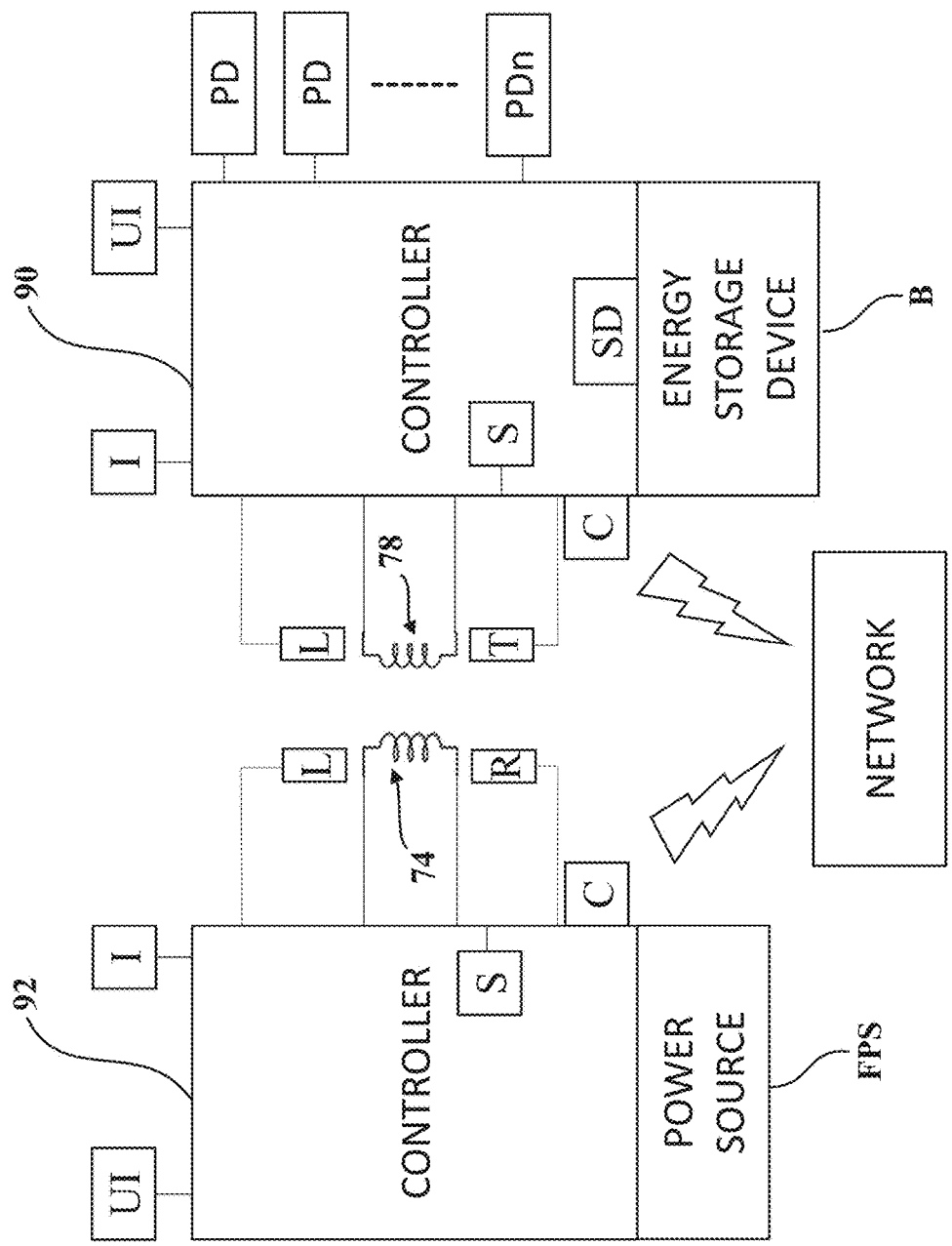
FIG. 5 is a schematic view of a control system.

Referring to FIG. 5, a control system is provided to control operation of the patient transport apparatus 30 and the power transfer device 70. The control system comprises an apparatus controller 90 and a power transfer controller 92. Each of the controllers 90, 92 have one or more microprocessors, microcontrollers, field programmable gate arrays, systems on a chip, discrete circuitry, and/or other suitable hardware, software, or firmware that is capable of carrying out the functions described herein. The controllers 90, 92 may communicate with a network via one or more communication devices C, which may be wireless transceivers that communicate via one or more known wireless communication protocols such as WiFi, Bluetooth, Zigbee, and the like. Wired communication is also contemplated. Additionally, the controllers 90, 92 may communicate with each other via the communication devices C such that the apparatus controller 90 could be configured to carry out all the functions of the power transfer controller 92 described herein, and vice versa. In some cases, only a single controller is needed to perform the functions recited herein.

The apparatus controller 90 may be carried on-board the patient transport apparatus 30, or may be remotely located. In one embodiment, the apparatus controller 90 is mounted to the base 34. In other embodiments, the apparatus controller 90 is mounted to the footboard 54. The apparatus controller 90 is coupled to the powered devices PD in a manner that allows the apparatus controller 90 to control the powered devices PD (connections shown schematically in FIG. 5). The apparatus controller 90 is also coupled to the power receiver assembly 76 to control operation of the power receiver 78. The apparatus controller 90 may communicate with the powered devices PD, power receiver 78, and/or other components via wired or wireless connections to perform one of more desired functions. The power transfer controller 92 is coupled to the power transmitter assembly 72 to control operation of the power transmitter 74. The power transfer controller 92 may communicate with the power transmitter 74 and/or other components via wired or wireless connections to perform one or more desired functions.

The controllers 90, 92 are configured to process instructions or to process algorithms stored in memory to control operation of the power transmitter 74 and/or the power receiver 78, or to control other electronic components described herein.

The user, such as a caregiver, may actuate a user input device UI (see FIG. 5), which transmits a corresponding input signal to the apparatus controller 90 and/or the transfer controller 92 to initiate power transfer from the power transmitter 74 to the power receiver 78. The user input devices UI may comprise any device capable of being actuated by the user. The user input devices UI may be configured to be actuated in a variety of different ways, including but not limited to, mechanical actuation (hand, foot, finger, etc.), hands-free actuation (voice, foot, etc.), and the like. The patient transport apparatus 30 may also comprise user input devices UI to actuate the powered devices PD. The user input devices UI may comprise buttons, such as separate buttons corresponding to lift, lower, Trendelenburg, reverse Trendelenburg, raise back section, lower back section, raise leg section, lower leg section, raise foot section, lower foot section, etc.

The user input devices UI may also comprise a gesture sensing device for monitoring motion of hands, feet, or other body parts of the user (such as through a camera), a microphone for receiving voice activation commands, a foot pedal, and a sensor (e.g., infrared sensor such as a light bar or light beam to sense a user's body part, ultrasonic sensor, etc.). Additionally, the buttons/pedals can be physical buttons/pedals or virtually implemented buttons/pedals such as through optical projection or on a touchscreen. The buttons/pedals may also be mechanically connected or drive-by-wire type buttons/pedals where a user applied force actuates a sensor, such as a switch or potentiometer. It should be appreciated that any combination of user input devices I may also be utilized. The user input devices UI may be located on one of the side rails 44, 46, 48, 50, the headboard 52, the footboard 54, or other suitable locations. The user input devices UI may also be located on a portable electronic device (e.g., iWatch®, iPhone®, iPad®, or similar electronic devices).

Referring to FIGS. 3 through 7, an alignment system 100 is provided to align the power transmitter 74 with the power receiver 78 so that efficient energy transfer occurs from the power transmitter 74 to the power receiver 78. Alignment may comprise any alignment between the power transmitter 74 and the power receiver 78, such as vertical alignment, longitudinal alignment, lateral alignment, combinations thereof, and the like. Alignment may also comprise distance alignment, e.g., placing the power transmitter 74 within a desired distance of the power receiver 78 and/or may comprise orientation alignment so that the coils of the power receiver 78 are in a desired orientation to the coils of the power transmitter 74. Other forms of alignment are also contemplated. In some cases, the distance between the coils of the power transmitter 74 and coils of the power receiver 78 is desired to be less than a wavelength of the frequency used for inductive coupling to ensure effective energy transfer. Orientations in which a large amount of magnetic field passes through the coils of the power receiver 78 may be desired for high energy transfer efficiency.

In the embodiments described herein, the power transmitter 74 is generally fixed with respect to the floor surface F and/or the wall surface W. Likewise, the power receiver 78 is generally fixed to the support structure 32, or other component of the patient transport apparatus 30. However, the power receiver 78 may be movable by virtue of a lift mechanism of the patient transport apparatus 30, or other movable components of the patient transport apparatus 30, such as when the power receiver 78 is located on the support frame 36, which can be lifted or lowered relative to the base 34. Nevertheless, alignment between the power transmitter 74 and the power receiver 78 is carried out by providing various forms of guidance to the user to guide the patient transport apparatus 30 into correct positioning relative to the power transfer device so that the power transmitter 74 and the power receiver 78 are aligned as needed.

Referring to FIGS. 3 and 4, the alignment system 100 comprises one or more locators L configured to locate one or more of the power receiver 78 and the power transmitter 74. The locators L facilitate alignment of the power transmitter 74 and the power receiver 78 by providing feedback to the user so that the user is able to reposition the patient transport apparatus 30 as needed, usually by wheeling the patient transport apparatus 30 in a desired manner to accomplish desired alignment. The locators L may comprise sensors coupled (e.g. wired or wirelessly) to the apparatus controller 90 and/or power transfer controller 92. The sensors are configured to sense the one or more of the power receiver 78 and the power transmitter 74 to facilitate alignment of the power transmitter 74 and the power receiver 78. The locators L may also comprise one or more markers to be sensed by the sensors to determine relative alignment between the power transmitter 74 and the power receiver 78. In many cases, the controllers 90, 92 utilize signals from the locators L to generate feedback to the user to achieve desired alignment of the power transmitter 74 and the power receiver 78.

In this embodiment, the locators L comprise an optical sensor in the form of a camera CAM (e.g., video camera) and a corresponding marker MAR located in a center of the power transmitter 74. Alignment is achieved once the camera CAM is able to view the corresponding marker MAR at a desired location. For example, referring to FIGS. 6 and 7, a display 102 of the patient transport apparatus 30 may be used to show a real-time image from the camera CAM so the user can align the marker MAR in a cross-hair on the display 102 to align the power transmitter 74 with the power receiver 78. The display 102 may be mounted on the footboard 54 or other part of the patient transport apparatus 30 and/or may form part of a user interface UI.

Figure 6:
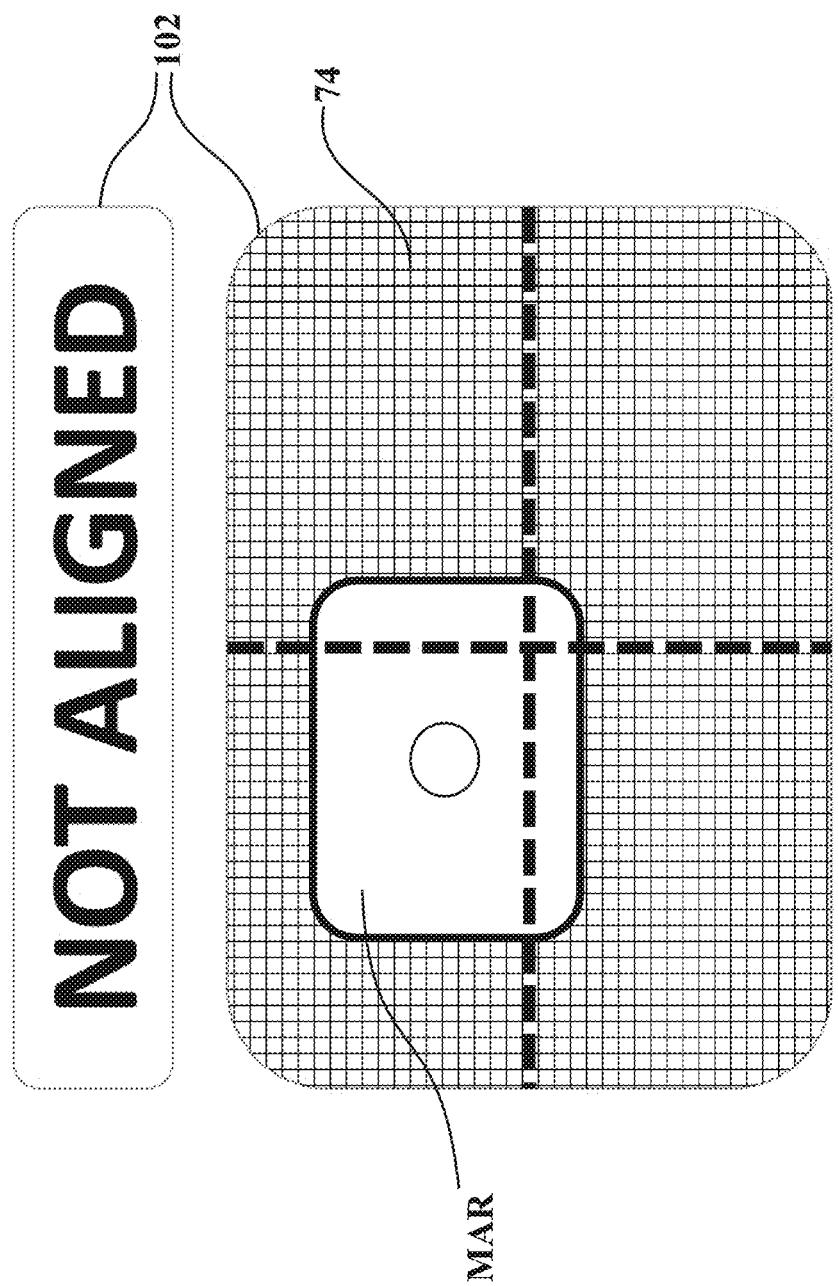
FIG. 6 is an illustration of a display screen showing that a power transmitter is not aligned with a power receiver.
Figure 7:
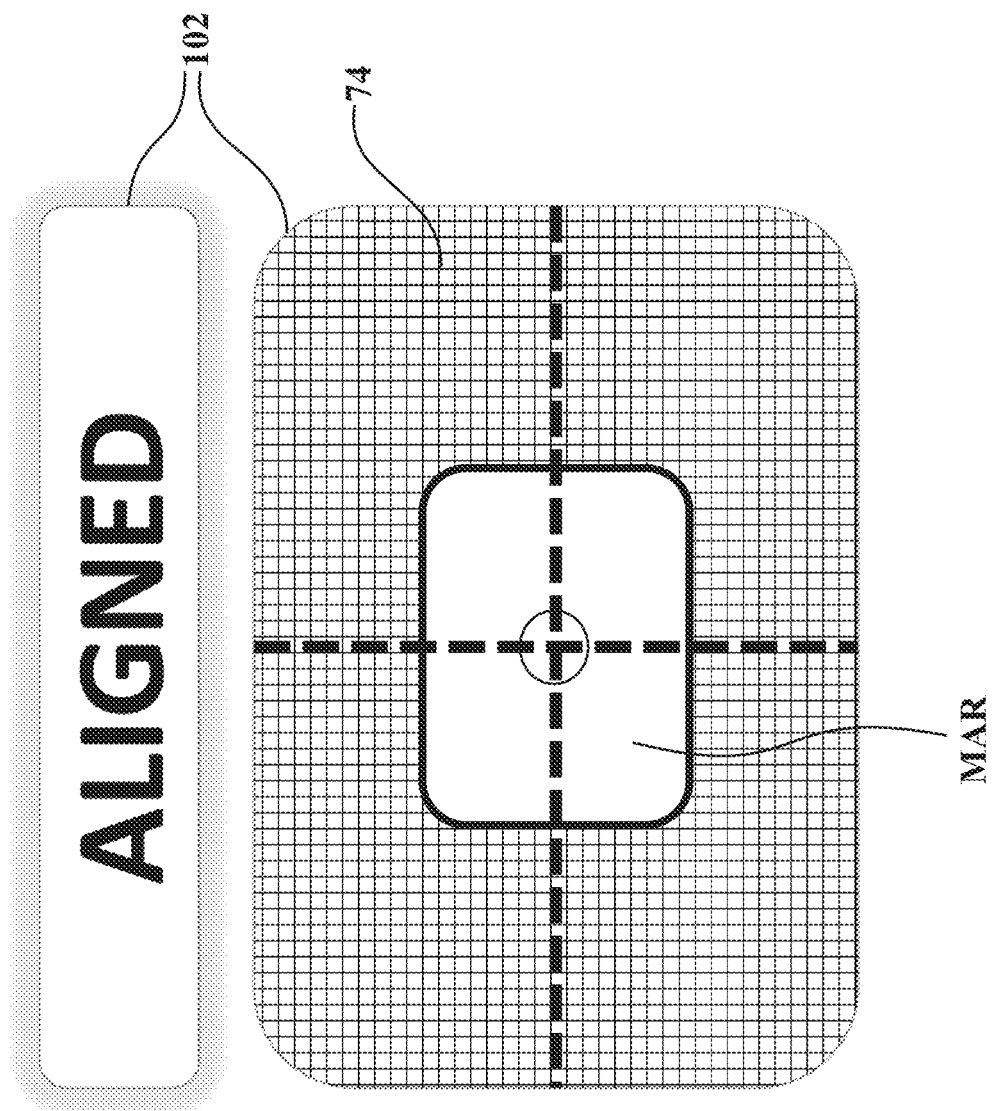
FIG. 7 is an illustration of the display screen showing that the power transmitter is aligned with the power receiver.

Misalignment of the power transmitter 74 and power receiver 78 is indicated in FIG. 6. In this case, the current alignment of power transmitter 74 and the power receiver 78 (e.g, the marker MAR is at least visible in the image displayed albeit not centered) may be satisfactory for some power transfer to occur, but not at a desired transfer rate. After the user moves the patient transport apparatus 30 to move the cross-hair over the marker MAR so that the marker MAR is centered in the cross-hair, desired alignment is achieved, as shown in FIG. 7. When the desired alignment is reached, the power transfer controller 92 is configured to activate the power transmitter 74 either automatically, or in response to user input. The power transfer controller 92 may automatically activate the power transmitter 74 based on pattern recognition and the location of the marker MAR being at a center of the image taken by the camera CAM. A piezoelectric element, motor with eccentric weight, or other tactile indicator, for example, could be coupled to the apparatus controller 90 and/or the power transfer controller 92 to be activated once alignment is achieved to provide a tactile response to the user that the power transmitter 74 is aligned with the power receiver 78.

Figure 8:
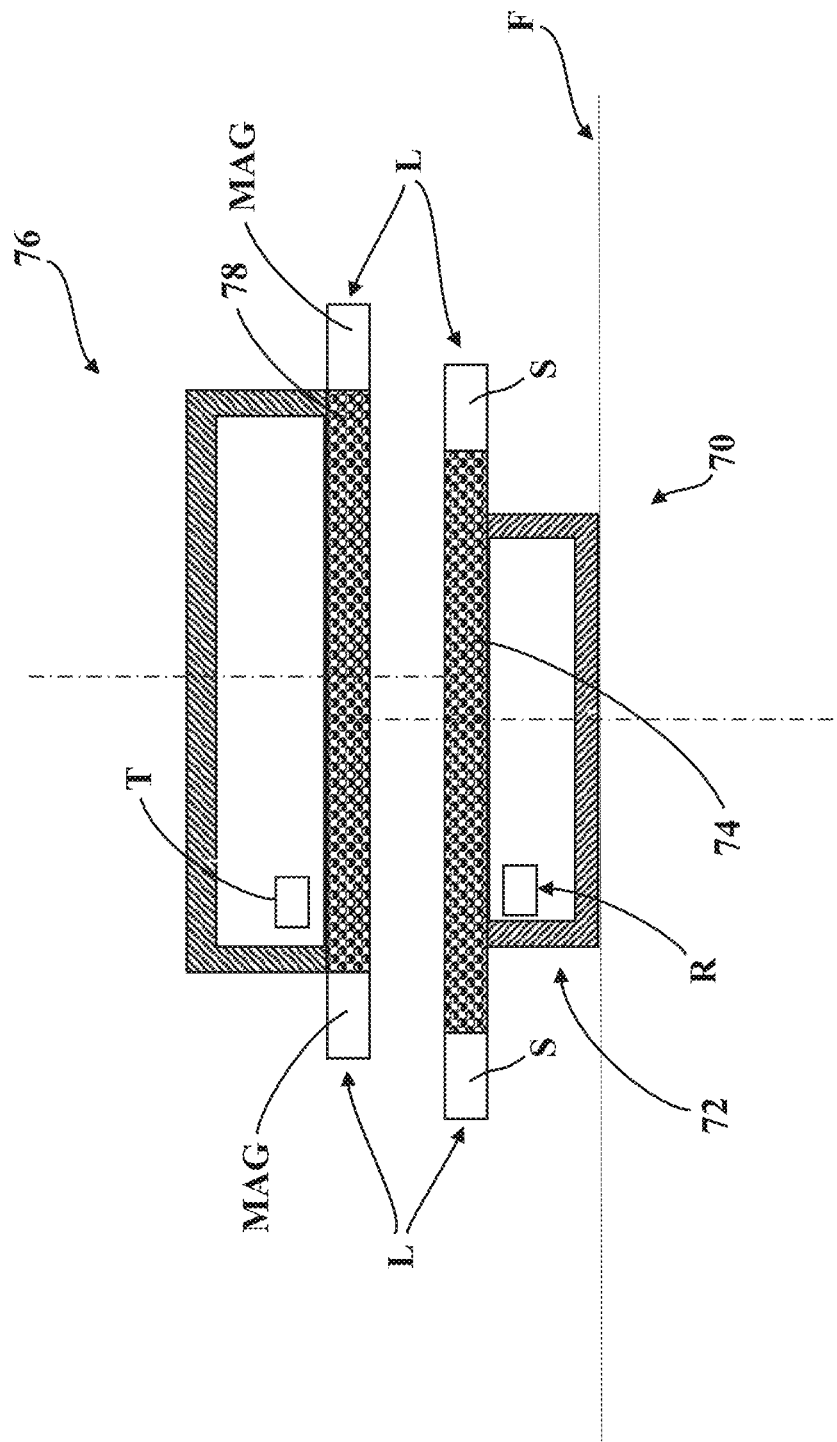
FIG. 8 is a partial sectional view of an alternative power transmitter assembly and alternative power receiver assembly with locators.

Referring to FIG. 8, in another embodiment, the locators L may comprise hall-effect sensors S and corresponding magnets MAG wherein the hall-effect sensors S generate variable signals based on the relative alignment of the magnets MAG with the hall-effect sensors S. For instance, hall-effect sensors S may be connected to the power transmitter 74 while magnets MAG are connected to the power receiver 78. When all the magnets MAG are in desired alignment with their corresponding hall-effect sensor S (e.g, around a periphery of the power transmitter 74/power receiver 78), then corresponding alignment signals from all the hall-effect sensors S will be received by the power transfer controller 92 indicating that desired alignment has been achieved. Other ways of verifying alignment and providing corresponding alignment feedback to the controllers 90, 92 have been contemplated.

The display 102 can similarly be used to provide feedback to the user based on the signals from the hall-effect sensors S to help guide the user's movement of the patient transport apparatus 30. For instance, the display 102 could show the locations of the magnets MAG relative to the hall-effect sensors S with instructions to the user as to how the patient transport apparatus 30 should be moved to achieve alignment. The instructions could be audible, visual, tactile, and the like. The instructions could comprise directional instructions (e.g., "move forward," "move rearward," "move left," "move right," etc.), distance instructions (e.g., "move 10 inches forward"), and/or other forms of instructions, such as graphical displays showing current positioning and desired positioning, and the like. A piezoelectric element, motor with eccentric weight, or other tactile indicator, for example, could be coupled to the apparatus controller 90 and/or the power transfer controller 92 to be activated once alignment is achieved to provide a tactile response to the user that the power transmitter 74 is aligned with the power receiver 78.

Referring back to the schematic diagram of FIG. 5, sensors S are also configured to determine if power is being transferred from the power transmitter 74 to the power receiver 78. In some cases, only one sensor is used. The sensor S may be coupled to the apparatus controller 90 and the power receiver 78 to generate a signal that varies in response to the power receiver 78 being energized during power transfer. A separate sensor S may also be connected to the power transfer controller 92 and used to verify that the coils of the power transmitter 74 are active—to avoid a false signal from the sensor S associated with the power receiver 78. The sensors S may also be able to determine, through connection to the apparatus controller 90 and/or the power transfer controller 92, a quality parameter of power transfer associated with alignment of the power transmitter 74 and the power receiver 78, such as the efficiency of power transfer wherein higher efficiency means that more energy is being transferred per unit time because of better alignment. The quality parameter can be measured, for instance, by sensing current/voltage produced in the power receiver 78 resulting from the power transfer or by measuring some other power transfer related parameter. The controllers 90, 92 may be configured to provide audible, visual, and/or tactile feedback to the user based on feedback from the sensors S to increase the efficiency of power transfer. In other words, alignment can be improved by the user based on feedback to increase efficiency by better aligning the power receiver 78 with the magnetic field generated by the power transmitter 74. The sensors S may comprise one or more of the coils of the power receiver 78 and/or the coils of the power transmitter 74, separate coils connected to the apparatus controller 90 and/or power transfer controller 92, sensors (e.g., circuits) to measure current and/or voltage, hall-effect sensors to sense changes in magnetic field, and the like.

One or more additional sensors S coupled to the apparatus controller 90 and the energy storage device B may be configured to sense charging of the energy storage device B as the energy storage device B is being charged by the power transmitter 74 through the power receiver 78 during inductive power transfer. The apparatus controller 90 may be configured to analyze signals from the sensor S and to modify operational parameters of the power transmitter 74 to account for sensed charging activity, e.g., by changing which coils are energized, modifying applied voltages, instructing the user to move the patient transport apparatus 30, etc., to improve the charging speed/efficiency of the energy storage device B.

One or more indicators I are coupled to the apparatus controller 90 and/or the power transfer controller 92. The indicators I are arranged to indicate that power is being transferred from the power transmitter 74 to the power receiver 78 based on the signals from the sensors S, to indicate whether desired alignment has been reached, and/or to indicate the quality parameter of the power transfer. The indicators I could be used in any of the embodiments described herein for this purpose. The indicators I comprise one or more of a visual indicator, an audible indicator, and a tactile indicator. The indicators I associated with the power transfer device 70 may be located on or adjacent to the power transmitter 74, on the floor surface F, on the wall surface W, on a user interface UI coupled to the power transfer controller 92, or any other suitable location. The indicators I associated with the patient transport apparatus 30 may be located on or adjacent to the power receiver assembly 76, the base 34, the headboard 52 and/or footboard 54, the side rails 44, 46, 48, 50, or any other suitable locations. The indicators I may comprise LEDs, displays, speakers, eccentric motors to generate tactile feedback, piezoelectric devices, and the like.

A state detector SD is coupled to the apparatus controller 90 to determine a state of the energy storage device B. The state of the energy storage device B may comprise an energy level of the energy storage device B, a current capacity of the energy storage device B, whether the energy storage device B is being actively charged, when the energy storage device B will be depleted, a time remaining for operation of the patient transport apparatus 30 based on the current state of the energy storage device B, and the like. The state detector SD may comprise any suitable electronic component or circuitry for measuring such states. For instance, the state detector SD may comprise one or more of a voltmeter, an amp-hour meter, and the like. Such states can also be indicated to the user via additional indicators I.

Referring to FIGS. 4 and 8, the patient transport apparatus 30 may comprise a unique identifier that is used by the power transfer controller 92 to confirm that the patient transport apparatus 30 (or power receiver 78 thereof) is an approved device authorized to receive power from the power transfer device 70. This can be used as an obstacle detection method to avoid charging foreign objects sensed on the mat/pad or objects not approved or designed for charging. Once the power transfer controller 92 determines that the unique identifier matches one or more approved identifiers, then the power transfer controller 92 allows power transfer to commence by activating the power transmitter 74 appropriately. If the identifier is not recognized by the power transfer controller 92, the power transfer device 70 may be inoperable for power transfer. A reader R (e.g., RFID reader) may be coupled to the power transfer controller 92 to read the identifier of the patient transport apparatus 30. The identifier may be embodied in an identification device, such as a tag T. Such tags T could comprise a radiofrequency identification tag (RFID), NFC tag, or other suitable tag. For example, the identifier could also be embodied in a bar code to be read by the reader R. Other forms of identification of the patient transport apparatus 30 are also contemplated. Additionally, or alternatively, the identifier may be stored in memory (e.g., NvRAM) of the apparatus controller 90 to be transmitted to the power transfer controller 92 via the communication devices C.

Figure 9B:
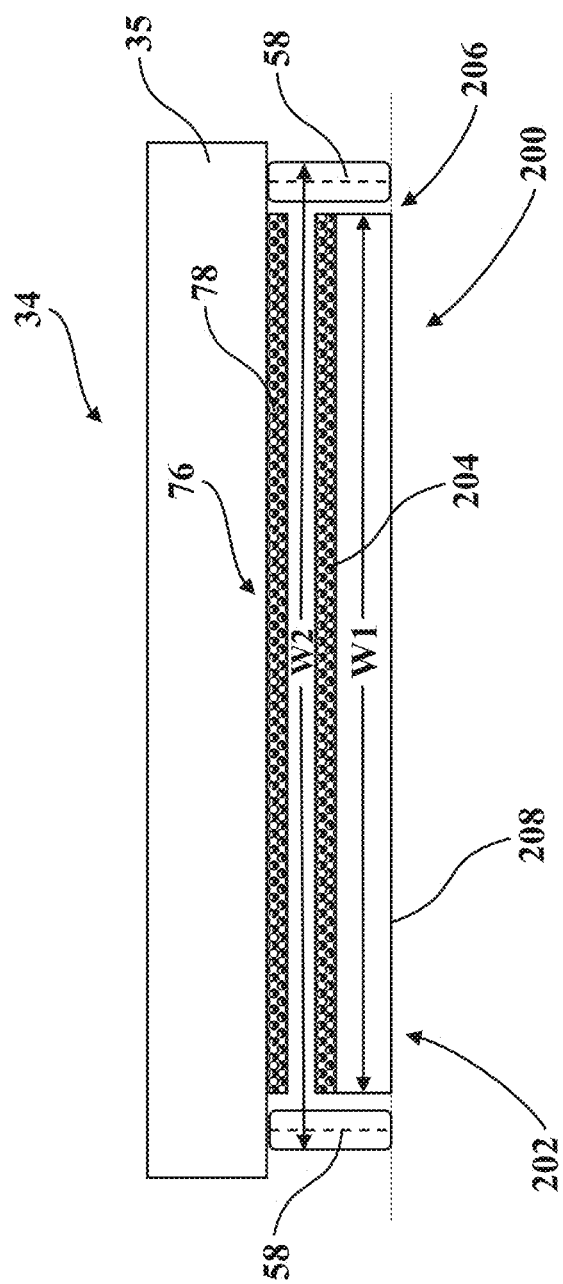
FIG. 9B is a front side view of the power transfer device of FIG. 9A.
Figure 9C:
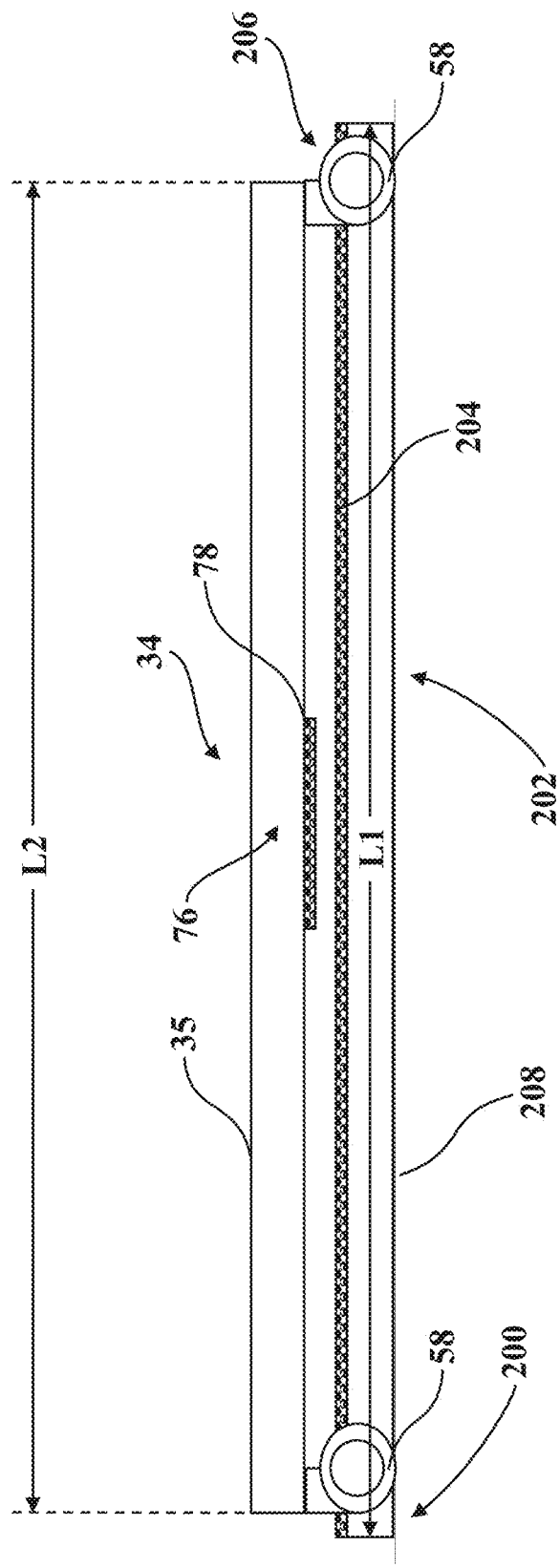
FIG. 9C is a left side view of the power transfer device of FIG. 9A.

Referring to FIG. 9A-9C, an alternative power transfer device 200 is shown in the form of a mat. This power transfer device 200 comprises a power transmitter assembly 202 with a power transmitter 204. In this embodiment, the power transfer device 200 is similar to the power transfer device 70 except for size and arrangement. An alignment system 206 comprises a casing 208 supporting the power transmitter assembly 202. The casing 208 comprises a geometric structure sized and shaped to guide the patient transport apparatus 30 so that a power receiver 78 of the patient transport apparatus 30 is aligned with the power transmitter 204 when the patient transport apparatus 30 is wheeled over the casing 208.

Referring to FIG. 9B, in this embodiment, the mat has a first width W1 and the patient transport apparatus 30 has a second width W2 between two of the wheels 58 (e.g., between head end wheels or between foot end wheels). The second width W2 may be measured between centers of the wheel stems or some other suitable location. The second width W2 is substantially the same as the first width W1 so that the two of the wheels 58 straddle the mat when the patient transport apparatus 30 is moved over the mat to align the power receiver 78 and the power transmitter 204. In other embodiments, the first width W1 is at least 50, 60, 70, 80, or 90% of the second width W2. Additionally, in some cases, to further ensure alignment, the mat has a first length L1 (see FIG. 9C) and the patient transport apparatus 30 has a second length L2 between two of the wheels 58 (e.g., between left side wheels or between right side wheels), wherein the first length L1 is greater than the second length L2 so that the patient transport apparatus 30 can be fully seated over the mat with all wheels 58 straddling the mat. The second length L2 may be measured between centers of the wheel stems or some other suitable location. Owing to the relative sizes of the power transmitter 204 and the power receiver 78, alignment of the power transmitter 204 and the power receiver 78 is ensured if all the wheels 58 straddle the mat.

Figure 10:
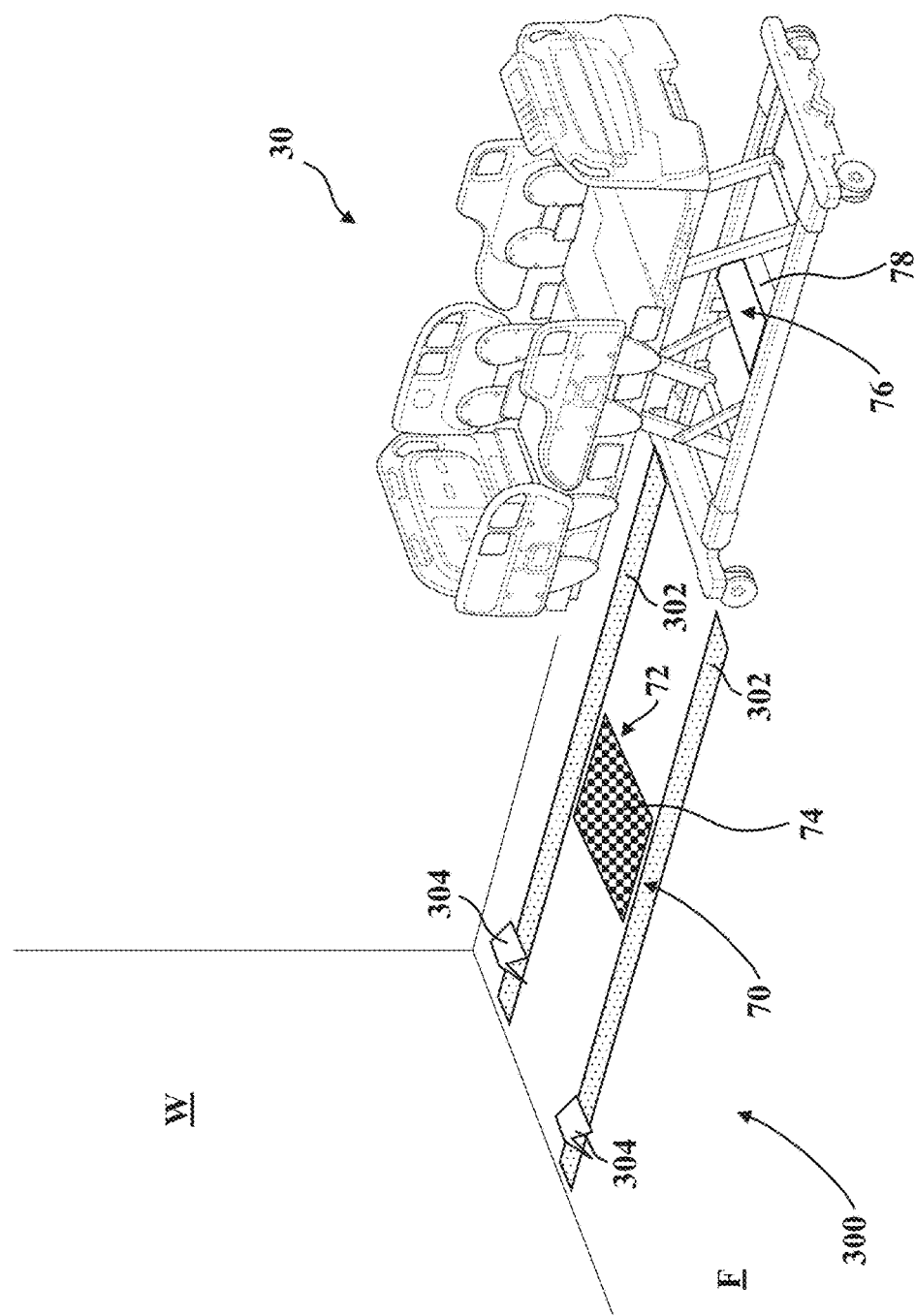
FIG. 10 is a perspective view of an alternative power transfer device with an alignment system comprising markings and stops on a floor surface.

Referring to FIG. 10, another alignment system 300 is shown to align the power transmitter 74 and the power receiver 78. In this embodiment, the alignment system 300 comprises markings 302 on the floor surface F to direct the user where to place the wheels 58 of the patient transport apparatus 30 when positioning the patient transport apparatus 30 over the power transmitter 74. The markings 302 are sized and shaped to indicate recommended pathways for the wheels 58. In the embodiment shown, the markings 302 comprise strips, such as stickers, paint, or the like, placed on the floor surface F. The markings 302 are also spaced from each other and parallel to each other so that if the user wheels the patient transport apparatus 30 over the power transmitter 74 while keeping the wheels 58 on the markings 302, the power transmitter 74 will be sure to be at least laterally aligned with the power receiver 78. Additionally, or alternatively, the alignment system 300 further comprises stops 304 located on the floor surface F at the ends of the markings 302 to be engaged by the wheels 58 to provide tactile indication to the user that the power transmitter 74 is longitudinally aligned with the power receiver 78. The stops 304 act as a curb to prevent further motion of the patient transport apparatus 30 once engaged. The stops 304 may comprise blocks, metal brackets, or the like placed on the floor surface F and protruding above the floor surface F. The stops 304 may be fixed to the floor surface F. The stops 304 may also be fixed to the wall and may protrude from the wall surface W. The alignment system 300 shown in FIG. 10 could likewise be used to align the patient transport apparatus 30 with a power transfer device located on the wall surface W.

Figure 11:
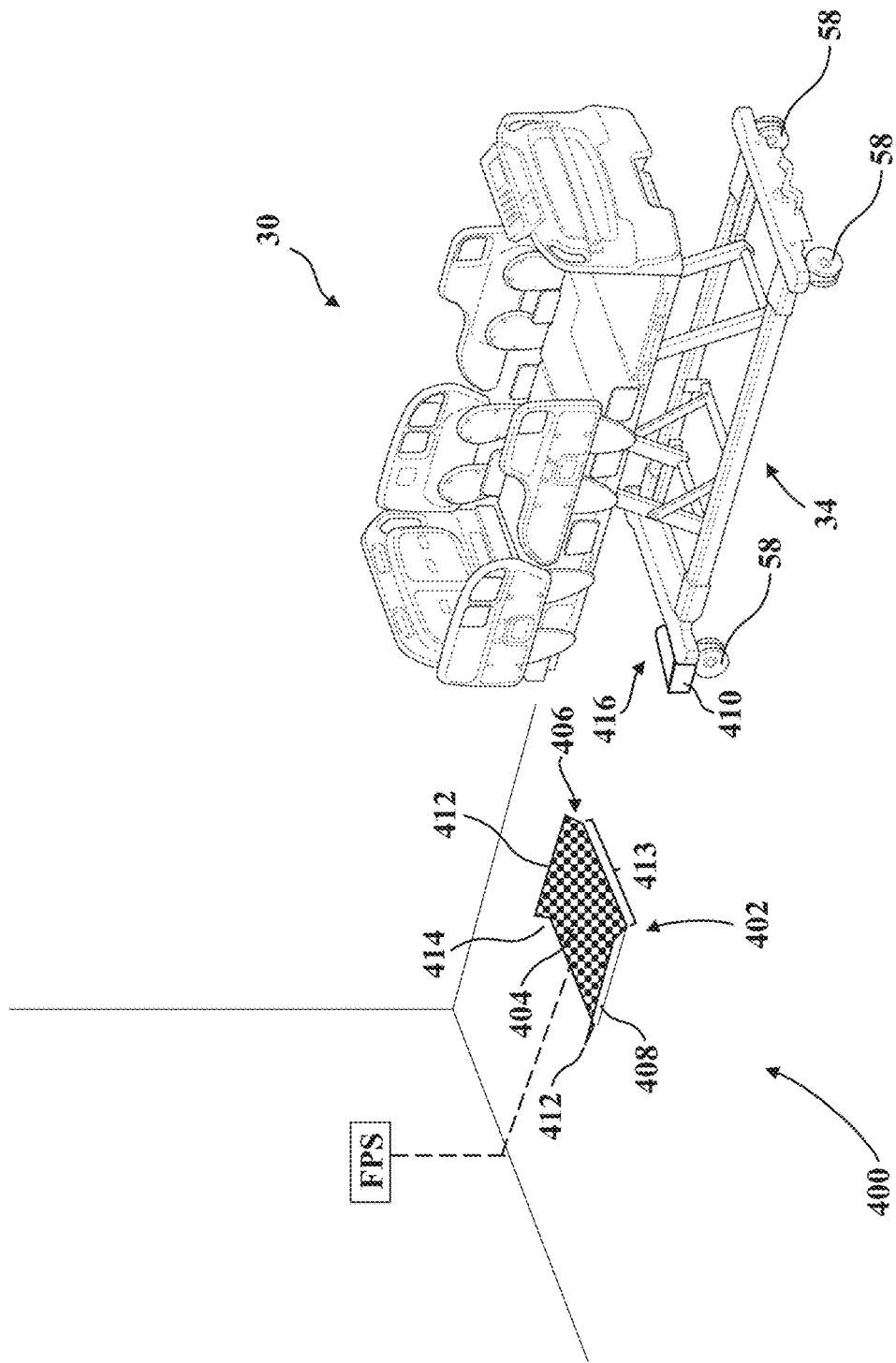
FIG. 11 is a perspective view of an alternative power transfer device with an alignment system comprising raised side walls of the power transmitter.
Figure 12:
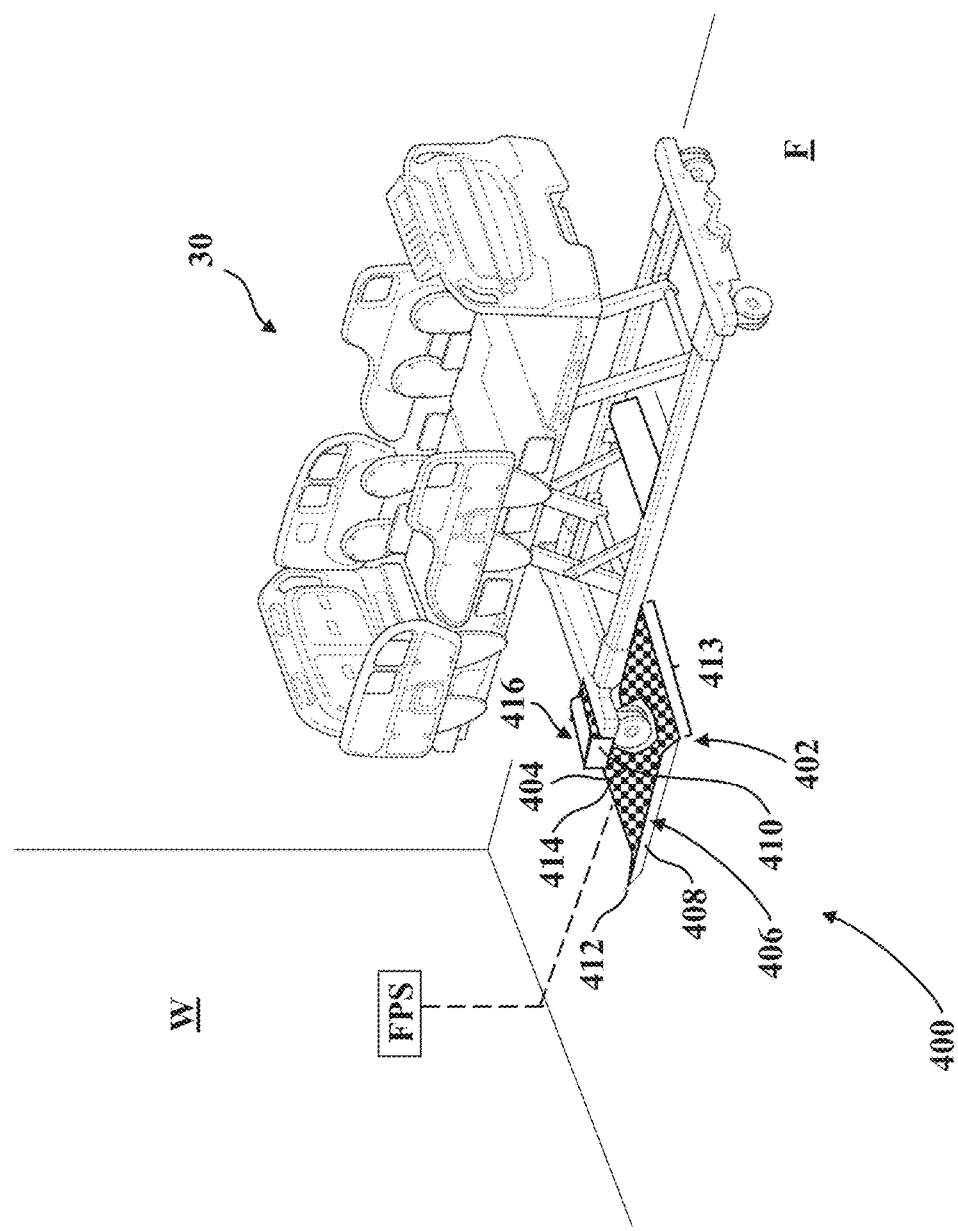
FIG. 12 is a perspective view of the power transfer device of FIG. 11 being engaged by the patient transport apparatus.
Figure 13:
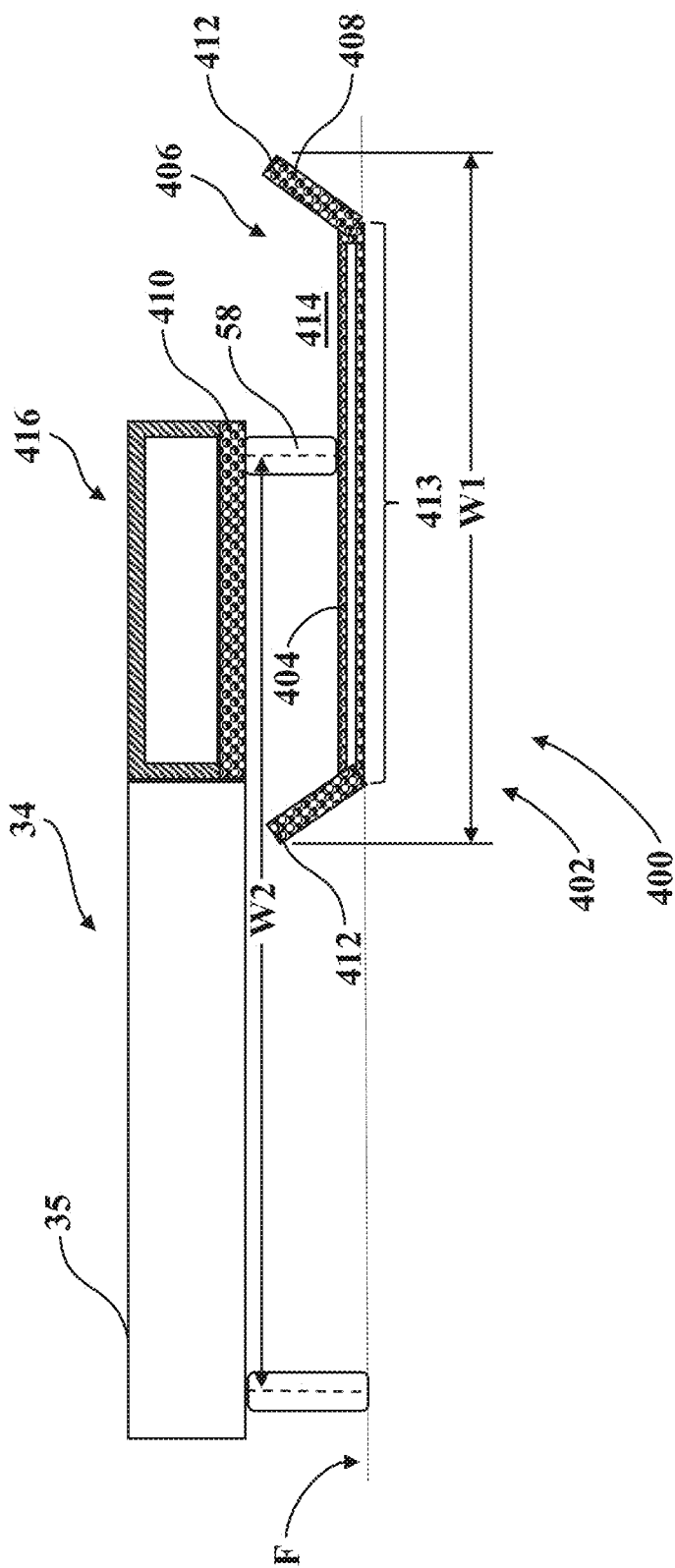
FIG. 13 is a partial sectional view of the power transfer device of FIG. 11 being engaged by the patient transport apparatus.

Referring to FIGS. 11-13, an alternative power transfer device 400 is shown in the form of a mat. This power transfer device 400 comprises a power transmitter assembly 402 with a power transmitter 404. In this embodiment, the power transfer device 400 is similar to the power transfer device 70 except for size and configuration. An alignment system 406 comprises a casing 408 supporting the power transmitter 404. The casing 408 comprises a geometric structure sized and shaped to guide the patient transport apparatus 30 so that a power receiver 410 of the patient transport apparatus 30 is aligned with the power transmitter 404 when the patient transport apparatus 30 is wheeled over the casing 408.

In this embodiment, the casing 408 has side portions on opposing sides of a floor engaging portion 413. These side portions comprise raised wings 412 that define a channel 414 sized and shaped to receive one of the wheels 58 of the patient transport apparatus 30. In this case, the power receiver 410 is part of a power receiver assembly 416 mounted to the base 34 adjacent to the wheel 58 so that if the wheel 58 is generally, centrally located on the floor engaging portion 413, then the power receiver 410 is aligned with the power transmitter 404 in a way that enables power transfer to occur (see FIG. 12).

Referring to FIG. 13, the mat has a first width W1 and the patient transport apparatus 30 has a second width W2 between two of the wheels 58 (e.g., between the head end wheels or between the foot end wheels). The second width W2 is larger than the first width W1 so that only one of the wheels 58 can engage the mat at one time. The wings 412 may be raised a distance off the floor surface F that is less than a distance from the floor surface F to the base 34 so that the base 34 is able to move over the wings 412 without contacting the wings 412, e.g., so the only part of the patient transport apparatus 30 able to engage the mat is one of the wheels 58. In other embodiments, two mats may be provided, one for each of the front wheels 58, wherein both wheels 58 must engage their respective mat to enable power transfer to occur. Sensors S coupled to one or both of the controllers 90, 92 may be used to detect such contact and activate the power transmitters of the separate mats.

Figure 14A:
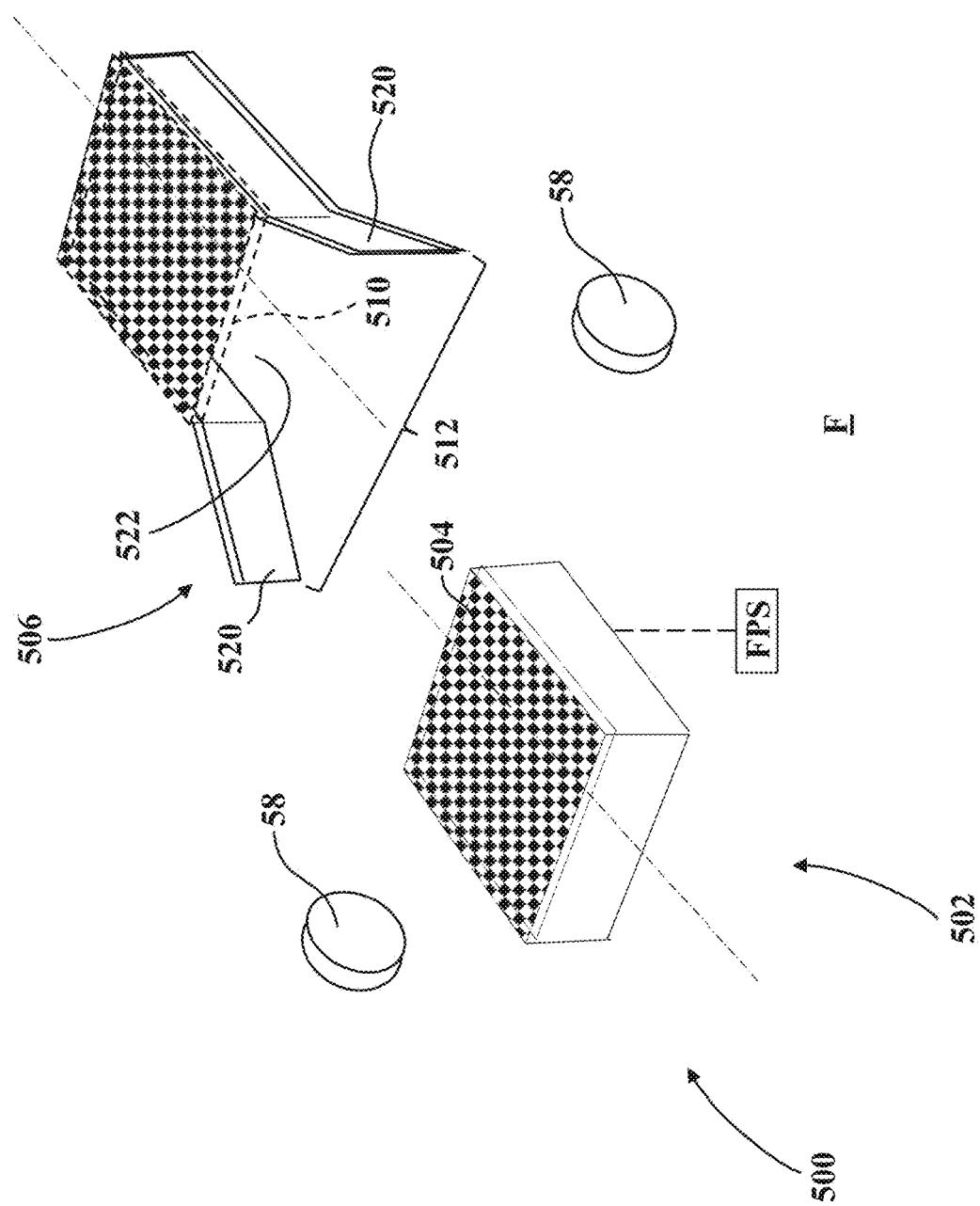
FIGS. 14A-14C are perspective views of an alternative alignment system to align a power transmitter with a power receiver.
Figure 14B:
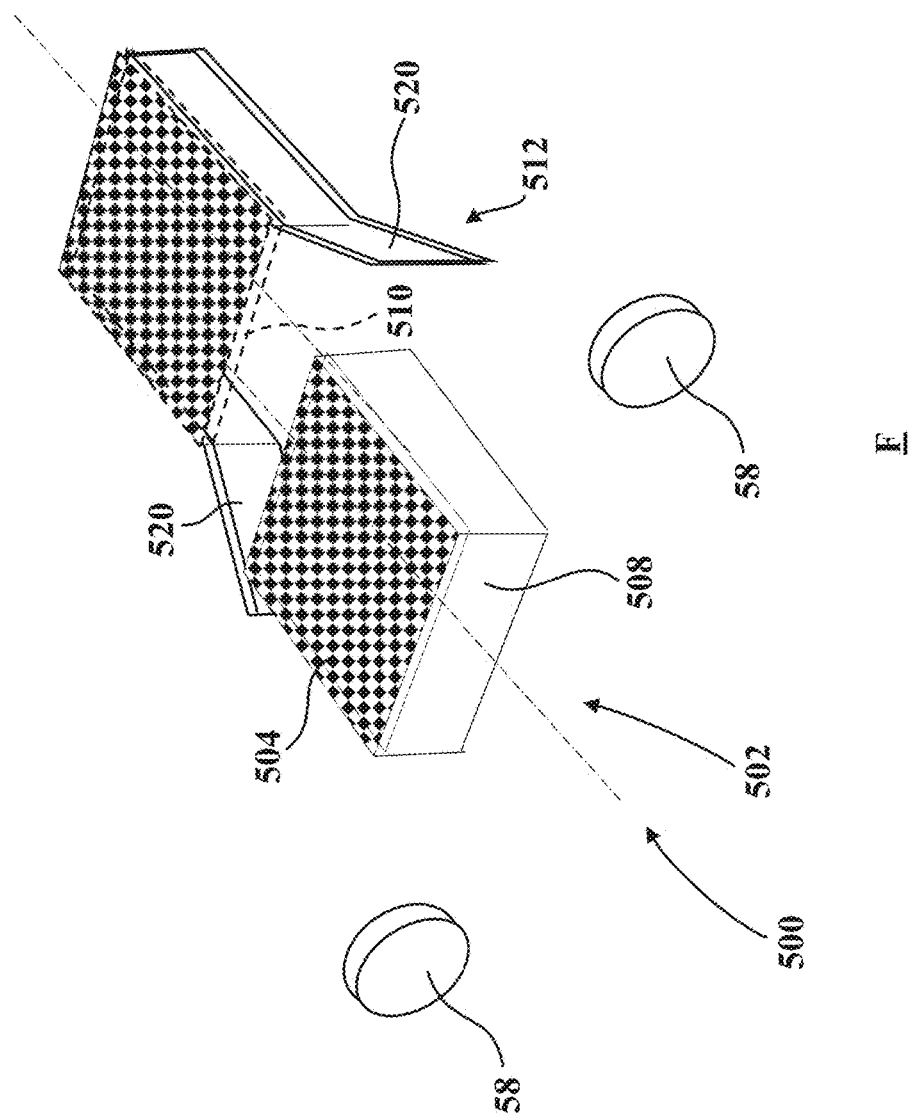
Figure 14C:
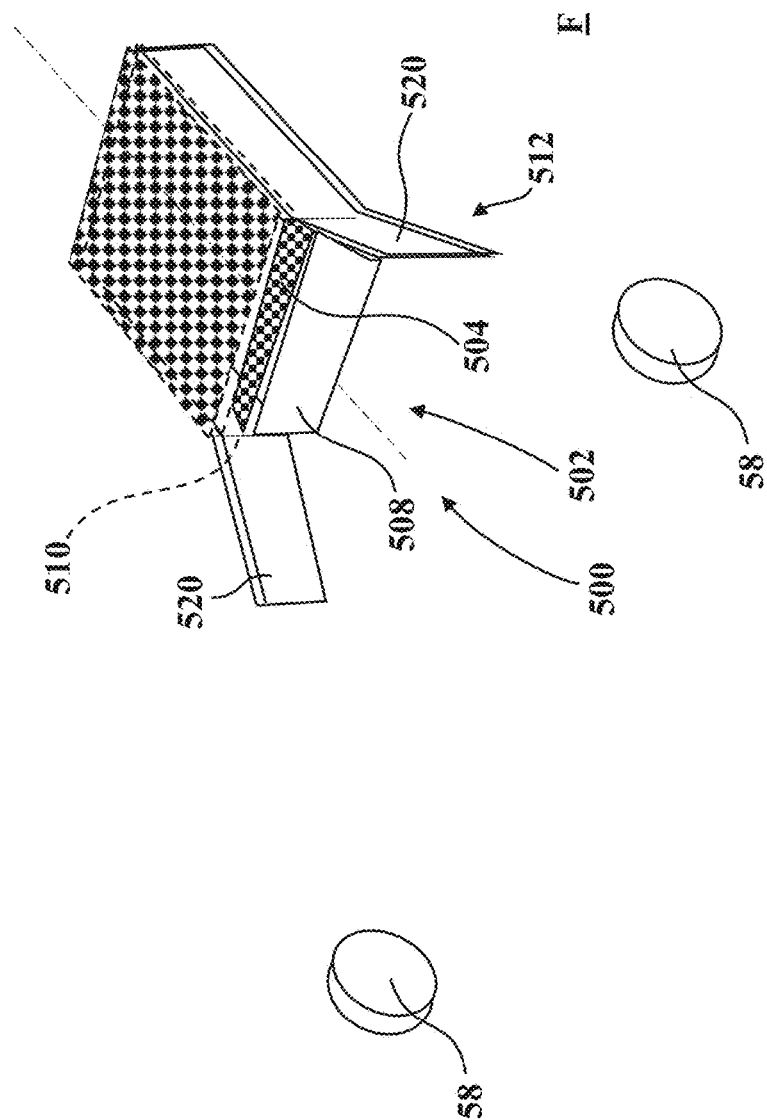

Referring to FIGS. 14A-14C, an alternative power transfer device 500 is shown in the form of rigid casing 508 mounted to the floor. The casing 508 may be mounted to the floor by fasteners, adhesive, and the like to fix the casing 508 to the floor surface F or within the floor, e.g., beneath the floor surface F. This power transfer device 500 comprises a power transmitter assembly 502 with a power transmitter 504. In this embodiment, the power transfer device 500 is similar to the power transfer device 70. An alignment system 506 comprises the casing 508 supporting the power transmitter assembly 502 above the floor surface F. The casing 508 comprises a geometric structure sized and shaped to guide the patient transport apparatus 30 so that a power receiver 510 of the patient transport apparatus 30 is aligned with the power transmitter 504 when the patient transport apparatus 30 is wheeled over the casing 508.

In this embodiment, the alignment system 506 further comprises a guide 512 sized and shaped to receive and mate with the casing 508 when the casing 508 is fully seated within the guide 512. The guide 512 is part of a power receiver assembly 516 mounted to the base 34. The guide 512 comprises guide arms 520 that define a width therebetween that narrows toward the power receiver 510. The guide 512 also has an opening 522 with a width sized to receive the casing 508 when the guide 512 is moved into position over the casing 508 by the user. Owing to the rigidly fixed nature of the casing 508 to the floor surface F, if during initial engagement of the guide 512 with the casing 508, the two are not aligned, i.e., the casing 508 instead engages one of the guide arms 520, then that engagement acts to steer the patient transport apparatus 30 into proper alignment. For instance, referring to FIG. 14B (compare to FIG. 14A), when the casing 508 engages the guide arm 520, the force involved with such contact, along with continued pushing of the patient transport apparatus 30 by the user in a generally longitudinal direction, will cause the wheels 58 to swivel to the orientation shown, so that the patient transport apparatus 30 is directed laterally until the casing 508 is rightly aligned with the guide 512 and able to fit into the opening 522 to align the power transmitter 504 with the power receiver 510. FIG. 14C illustrates the casing 508 seated in the opening so that the power transmitter 504 is aligned with the power receiver 510.

Figure 15:
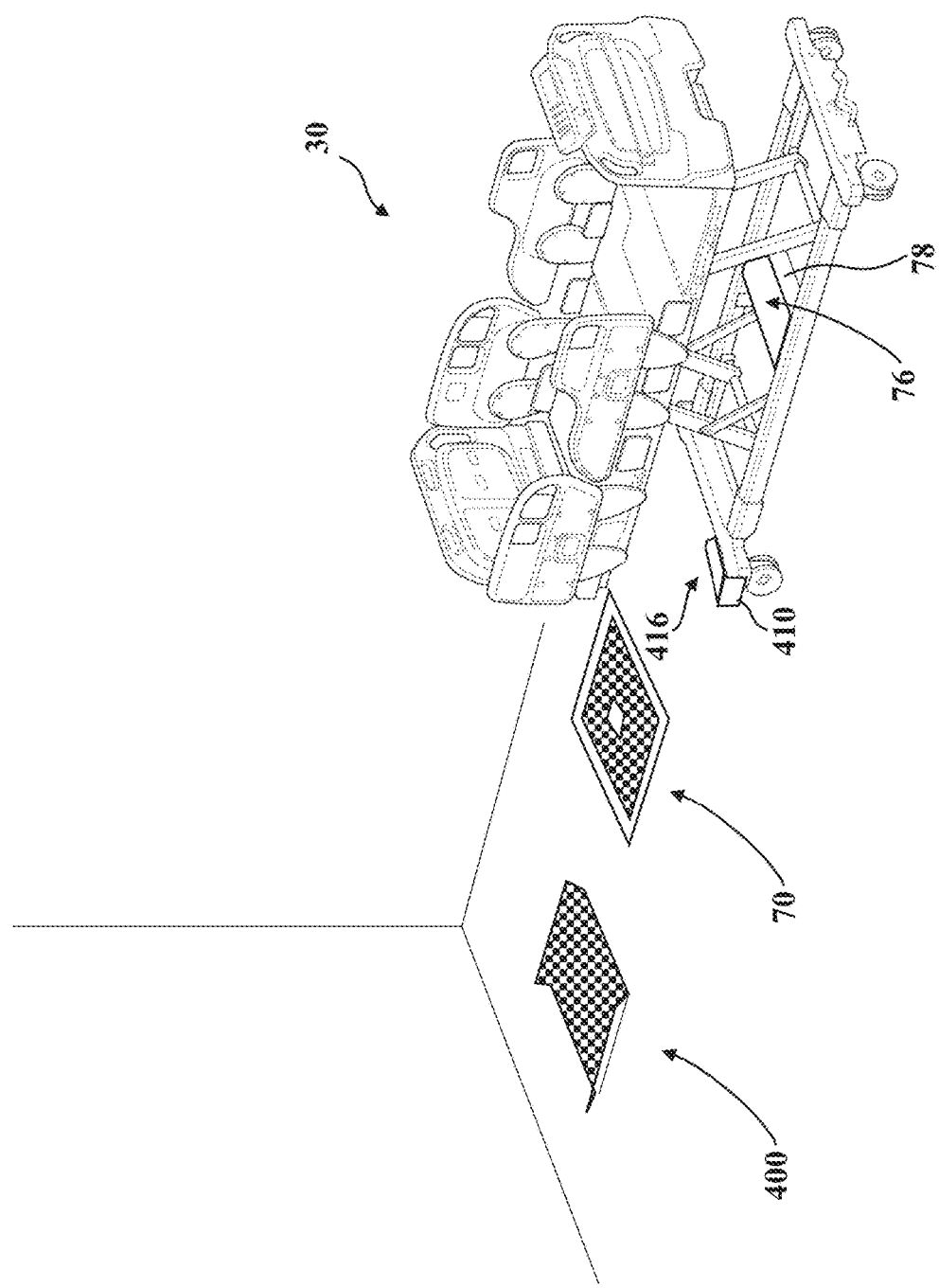
FIG. 15 is a perspective view of multiple power transfer devices being employed to transfer power to multiple power receiver assemblies of the patient transport apparatus.

Referring to FIG. 15, multiple power transfer devices 70, 400 may be employed to transfer power to multiple power receiver assemblies 78, 416 either simultaneously or sequentially. The power transfer devices 70, 400 may have differently sized/shaped/type or numbers of coils to transfer power, and similarly the power receiver assemblies 78, 416 may have differently sized/shaped/type or numbers of coils to receive power. The power transfer devices 70, 400 may be matched to the respective power receiver assemblies 78, 416 in a way that quick, less efficient, power transfer occurs through one matched pair, while slower, more efficient, power transfer occurs through the other matched pair.

Figure 16:
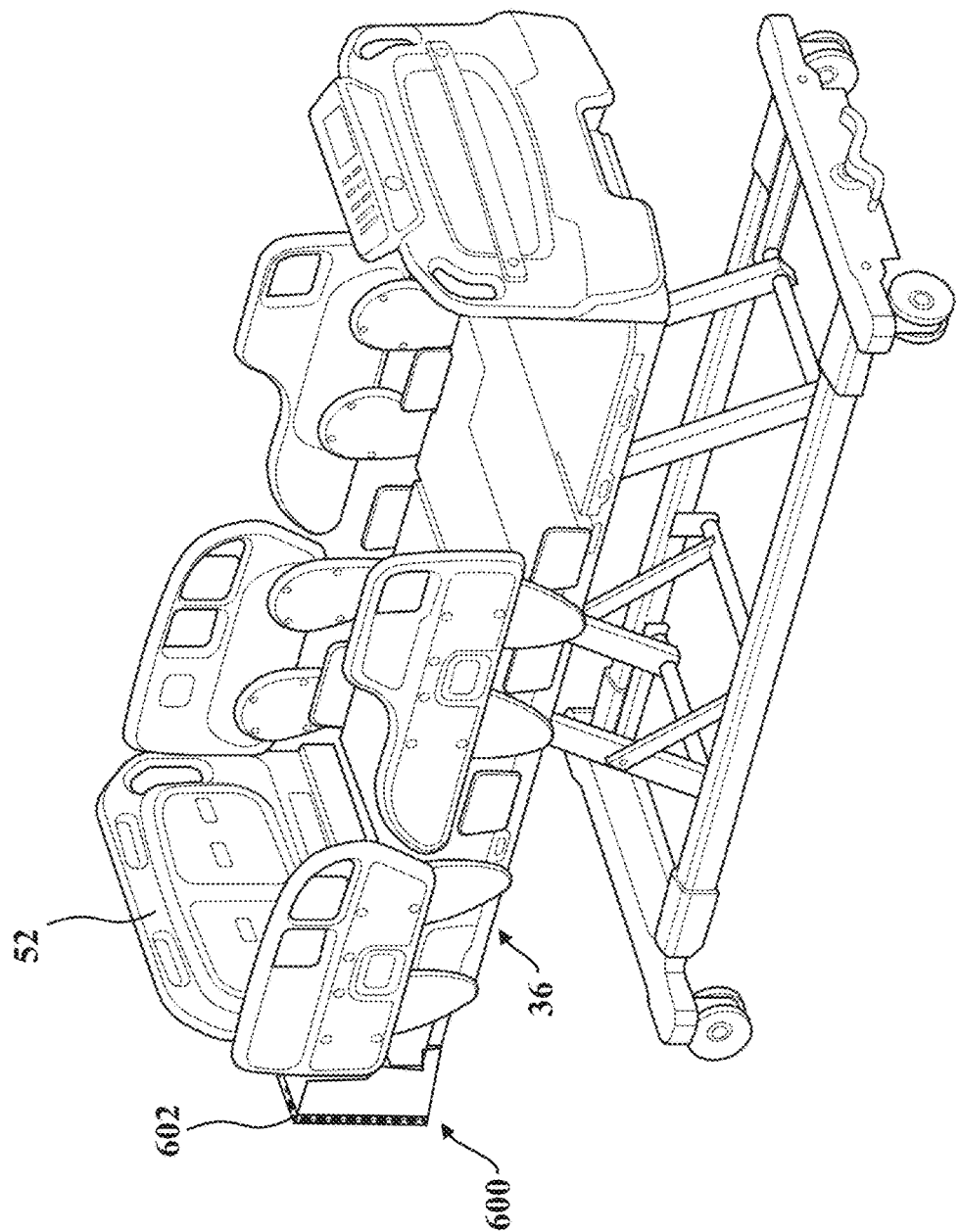
FIG. 16 is perspective view of an alternative patient transport apparatus with a power receiver assembly mounted to a support frame adjacent a headboard.
Figure 17:
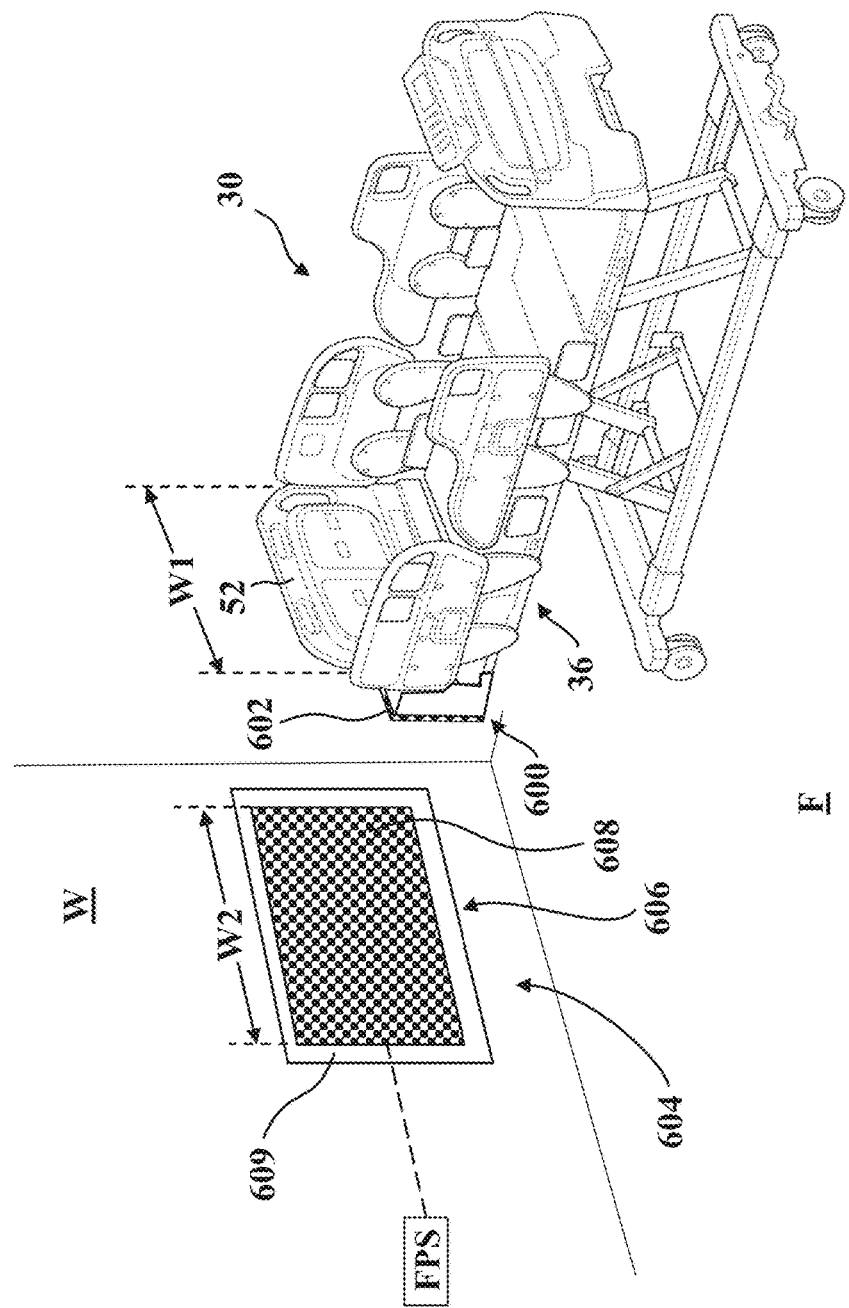
FIG. 17 is an illustration of the patient transport apparatus of FIG. 16 in relation to a power transfer device located in a wall.
Figure 18:
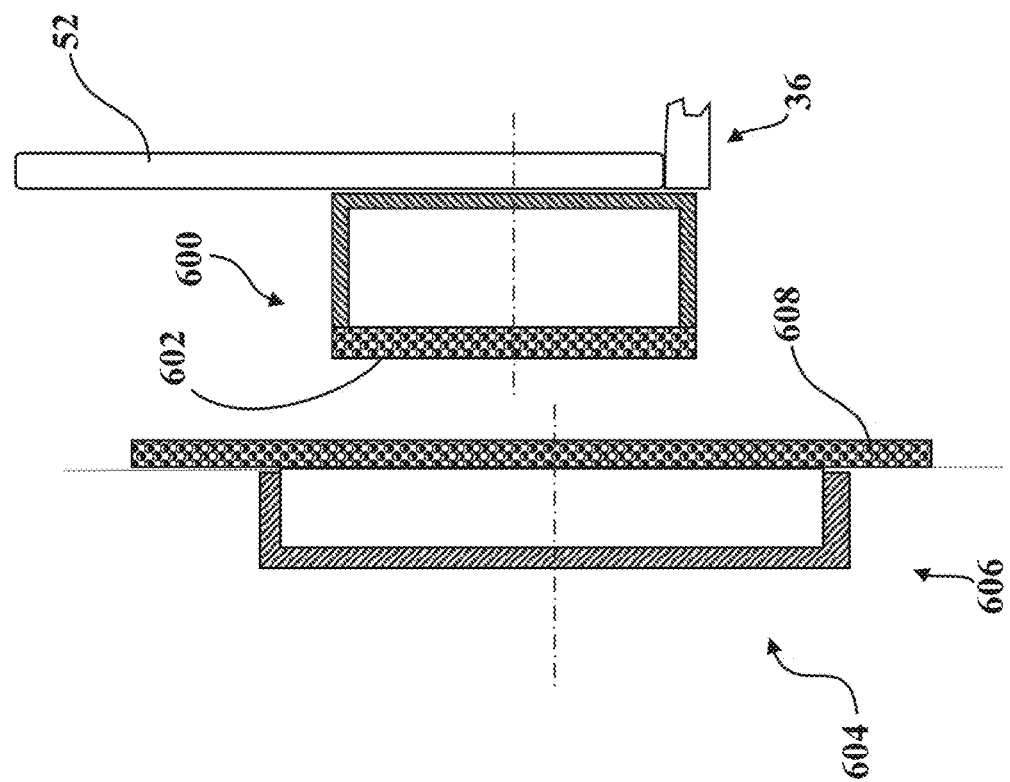
FIG. 18 is a partial sectional view of the power transmitter assembly and the power receiver assembly of FIG. 17.

Referring to FIGS. 16-18, the patient transport apparatus 30 is shown with an alternative power receiver assembly 600 with power receiver 602 mounted to the support frame 36 adjacent to the headboard 52. In this embodiment, a power transfer device 604 has a power transmitter assembly 606 with a power transmitter 608 that is oversized as compared to the headboard 52 (see FIG. 17) and the power receiver (see FIG. 18) so that as the user is moving the patient transport apparatus 30 into position for power transfer, the user is able to easily visually reference the edges of the power transmitter 608 so that alignment with the power receiver 602 is easily accomplished. More specifically, the headboard 52 has a first width W1 and the power transmitter 608 has a second width W2 larger than the first width W1. Likewise, visible markings 609 on the wall surface W having a width larger than the headboard 52 could similarly provide a suitable alignment system—in this case the power transmitter 608 could be smaller than the headboard 52. In other embodiments, the visible markings 609 could comprise an outline of the headboard 52 with a similar size and/or shape of the headboard 52 so that the user only need to match up the headboard 52 with its outline on the wall surface W to ensure alignment. In this case, one or more locators L could be used to assist with alignment, but may be unnecessary as the user is able to visually align the power transmitter 608 and the power receiver 602.

Figure 19:
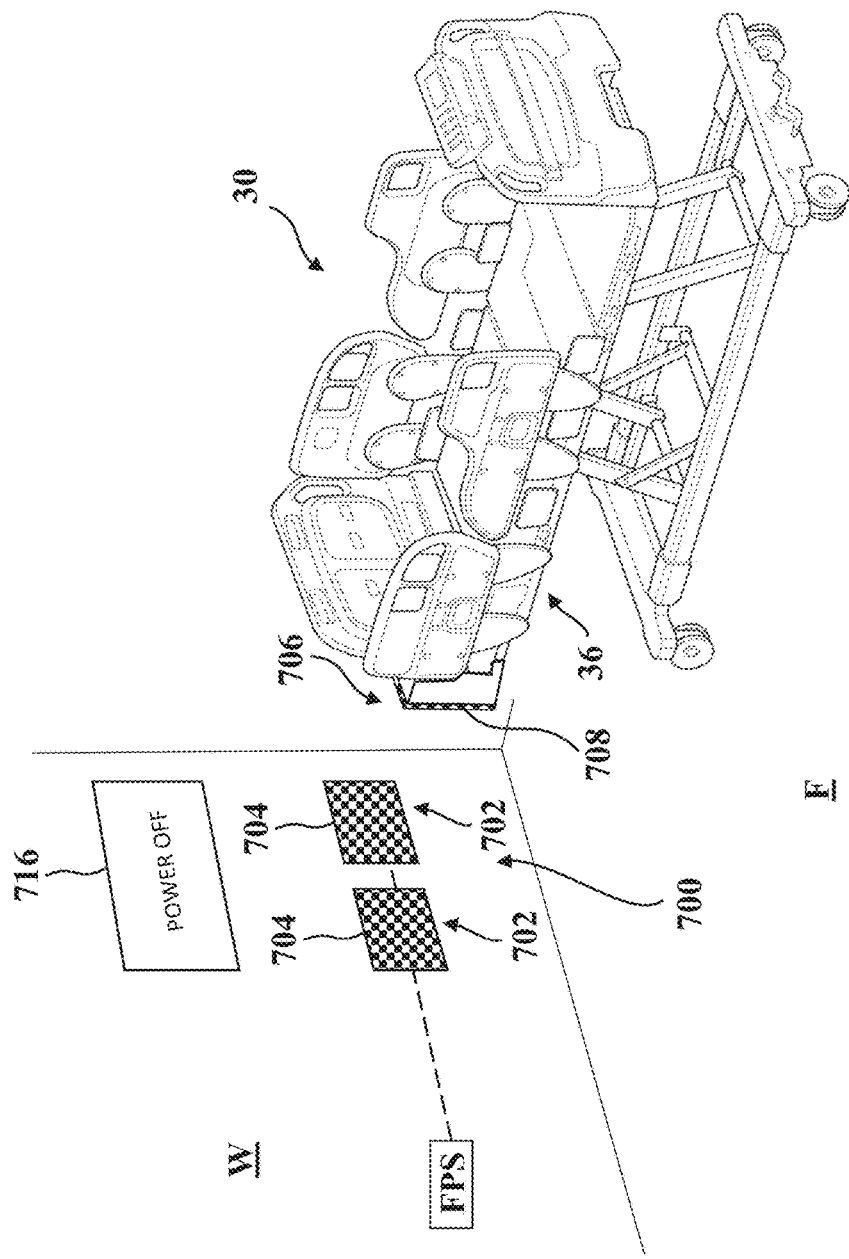
FIG. 19 is an illustration of the patient transport apparatus of FIG. 16 in relation to an alternative power transfer device located in the wall.
Figure 20:
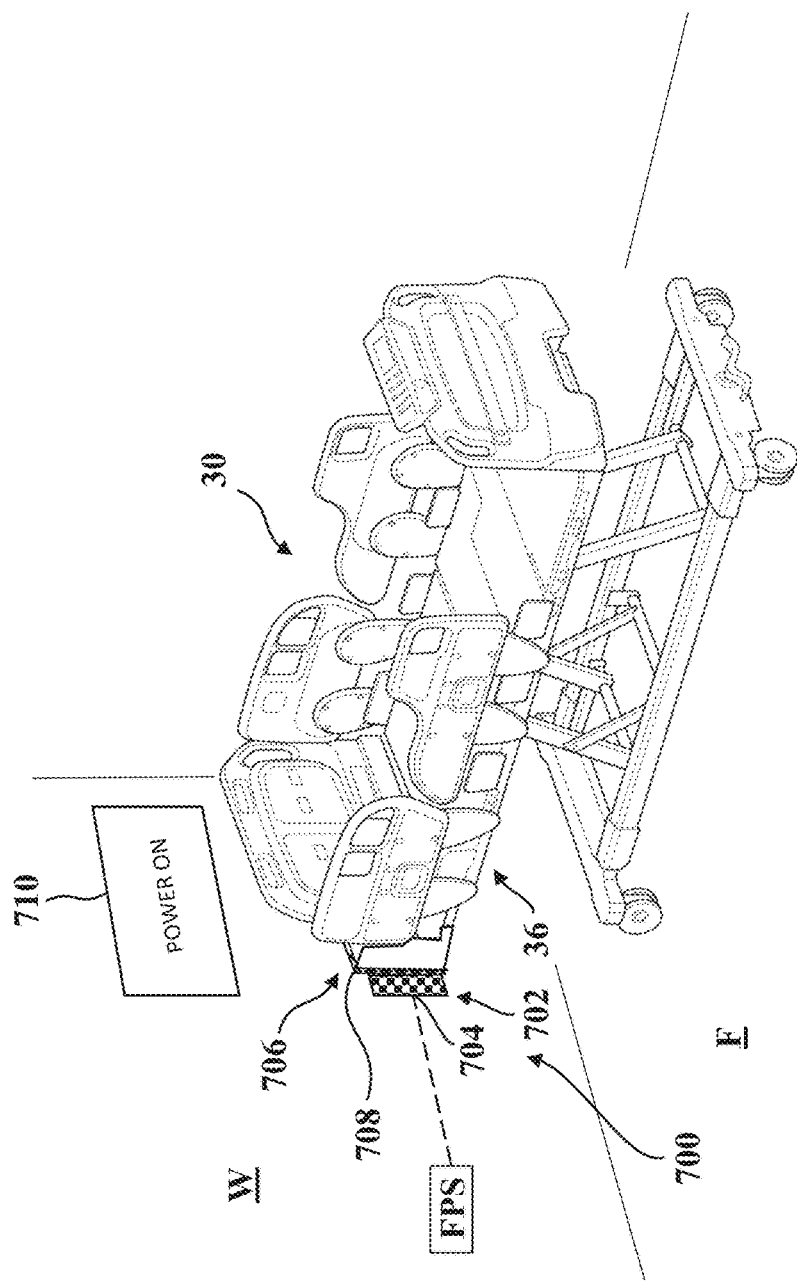
FIG. 20 is an illustration of the patient transport apparatus of FIG. 19 engaging a power transmitter assembly of the power transfer device of FIG. 19.
Figure 21:
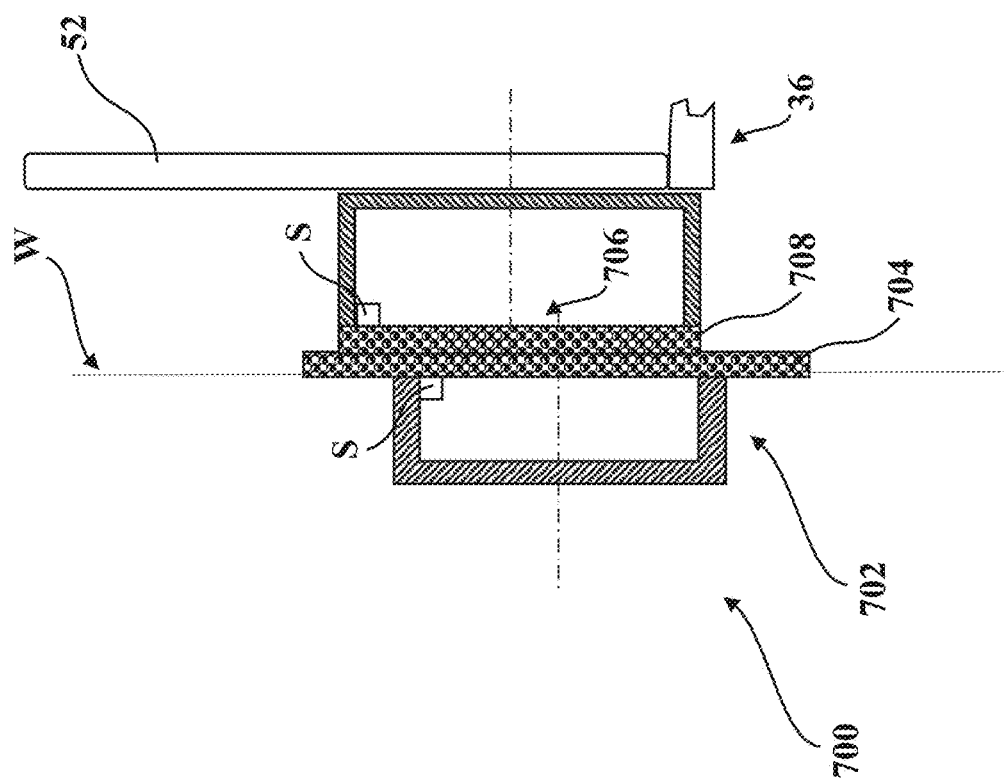
FIG. 21 is a partial sectional view of the power transmitter assembly and a power receiver assembly of the patient transport apparatus of FIG. 20.

Referring to FIGS. 19-21, an alternative power transfer device 700 is shown that comprises two power transmitter assemblies 702, each with its own power transmitter 704. Similarly, the patient transport apparatus 30 comprises two power receiver assemblies 706, each with its own power receiver 708 (only one shown). In this embodiment, each power transmitter 704 is sized and shaped to be contacted by one power receiver 708 to enable power transfer. One or more sensors S coupled to one or both of the controllers 90, 92 could be provided in the power transmitter assemblies 702 and/or the power receiver assemblies 706 to verify such contact or to verify that the power transmitters 704 are in a desired proximity to their associated power receivers 708. Such sensors S may comprise contact switches, hall-effect sensors, other proximity sensors, or the like.

If one of the power receivers 708 is overlying both of the power transmitters 704 (referred to as a short condition), then the power transmitters 704 would be disabled. In some cases, the power transmitters 704 and/or power receivers 708 are sized and shaped, and spaced from one another at such a distance that one power receiver 708 is unable to contact both power transmitters 704 simultaneously. Still, the power transfer device 700 is configured so that the sensors S must first transmit signals to the power transfer controller 92 indicating that the corresponding pairs of power transmitters 704 and power receivers 708 are in contact before activating power transfer through the power transmitters 704. As shown in FIGS. 19 and 20, a display 710 could be provided in a conspicuous location on the wall surface W, floor surface F, on the patient transport apparatus 30, and/or on the power transfer device 700 that indicates when such contact has successfully been made and power transfer activated.

Figure 22:
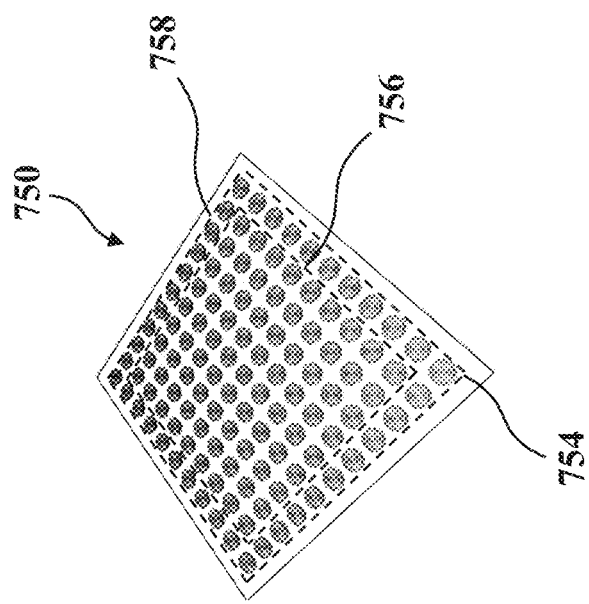
FIG. 22 is a perspective view of a power transmitter/power receiver having multiple modules of coils.
Figure 23:
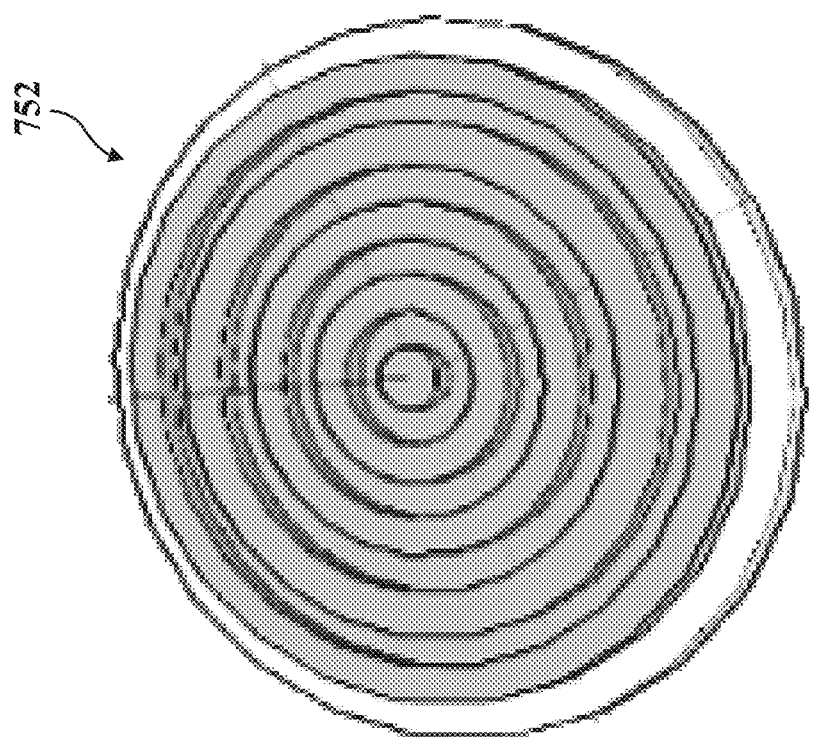
FIG. 23 is a perspective view of one of the modules.

The arrangement of coils, windings, or other current carrying wires for the power transmitters and the power receivers described herein can comprise a number of different configurations. In the embodiment shown in FIGS. 22 and 23, an array 750 of coil modules 752 are located on a substrate 754 to form the power transmitter or the power receiver. The array 750 of coil modules 752 can be arranged in a grid pattern as shown or other suitable pattern. Each of the coil modules 752 may comprise a single coil or winding, multiple coils or windings, and/or combinations thereof. The coils/windings may have a circular, spiral, or rectangular shape when viewed in plan, or any other suitable shape for enabling wireless power transfer from the power transmitter to the power receiver.

In some cases, the array 750 of coil modules comprises coil modules of a first type arranged in a central portion 756 of the array and coil modules of a second type arranged along an outer periphery 758 of the array 750, e.g., the outer rows/columns of coil modules. The array 750 may comprises spaced apart coil modules 752 as shown, or may comprise overlapping coil modules. The coil modules 752 at the edges of the array 750 may be one type of coil that allows for incomplete alignment, but provides some charging, while the coil modules 752 in the central portion are better aligned and at a smaller distance from the power receiver to do the majority of the charging. For example, the coils in the wings 412 in the embodiment of FIGS. 11-13 could be different than the coils in the floor engaging portion 413.

A combination of coils that charge according to different charging protocols may also be utilized, such as coils that charge according to the Qi wireless charging standard and coils that charge according to the A4WP wireless charging standard. In this case, if coil modules of different types are used, the coil modules are spaced at such a distance to avoid interference.

In some cases, the power transmitters described herein may be sized to be suitably aligned with more than one patient transport apparatus 30 at one time to charge more than one patient transport apparatus 30. In this case, the power transmitter may have separately and selectively activatable coils or zones of coils to transfer power. The power transmitter may be configured to selectively transfer power to a first power receiver of a first patient transport apparatus 30 and a second power receiver of a second patient transport apparatus 30. Operational parameters of one or more of the power transmitter and the power receivers may be controlled by one or more of the controllers 90, 92 to coordinate power transfer from the power transmitter to each of the power receivers, e.g., simultaneously, sequentially, etc. For instance, one or more of the coils may be selectively energized to transfer power to one power receiver, but not another. Sensors S may be coupled to the apparatus controller 90 and/or the power transfer controller 92 to determine if the power receivers of the patient transport apparatuses 30 are aligned with the power transmitter to receive power. The power transfer controller 92 may be configured to adjust a transmission frequency of the power transmitter to transfer power sequentially to the multiple power receivers and/or to control the transmission frequency of the power transmitter to be on resonance or off resonance with respect to one or more of the power receivers.

In some embodiments, data communication between the power transfer device and one or more of the patient transport apparatuses 30 may be provided through a harmonic of the transmission frequency. Communication may occur between one or more of the following: the power transmitter and the power receiver; different power transmitters; and different power receivers. Communication can be used to verify the presence of the power receiver and that it is compatible with the power transmitter. Modulation of the voltage in the power transmitter, for instance, can also be used to send data to the apparatus controller 90 coupled to the power receiver. The power receiver can likewise communicate data back to the power transfer controller 92. The data may comprise signal strength, control errors, end power commands, and the like. Signal strength can help align the power transmitter and the power receiver by directing the user to move the power receiver as needed to improve the signal strength. Control error may indicate the amount of error between input voltage seen by the power receiver and the voltage required. The power transfer controller 92 may adjust the voltage based on this feedback in a control loop. Thus, power delivery can be tuned based on this feedback.

Figure 24:
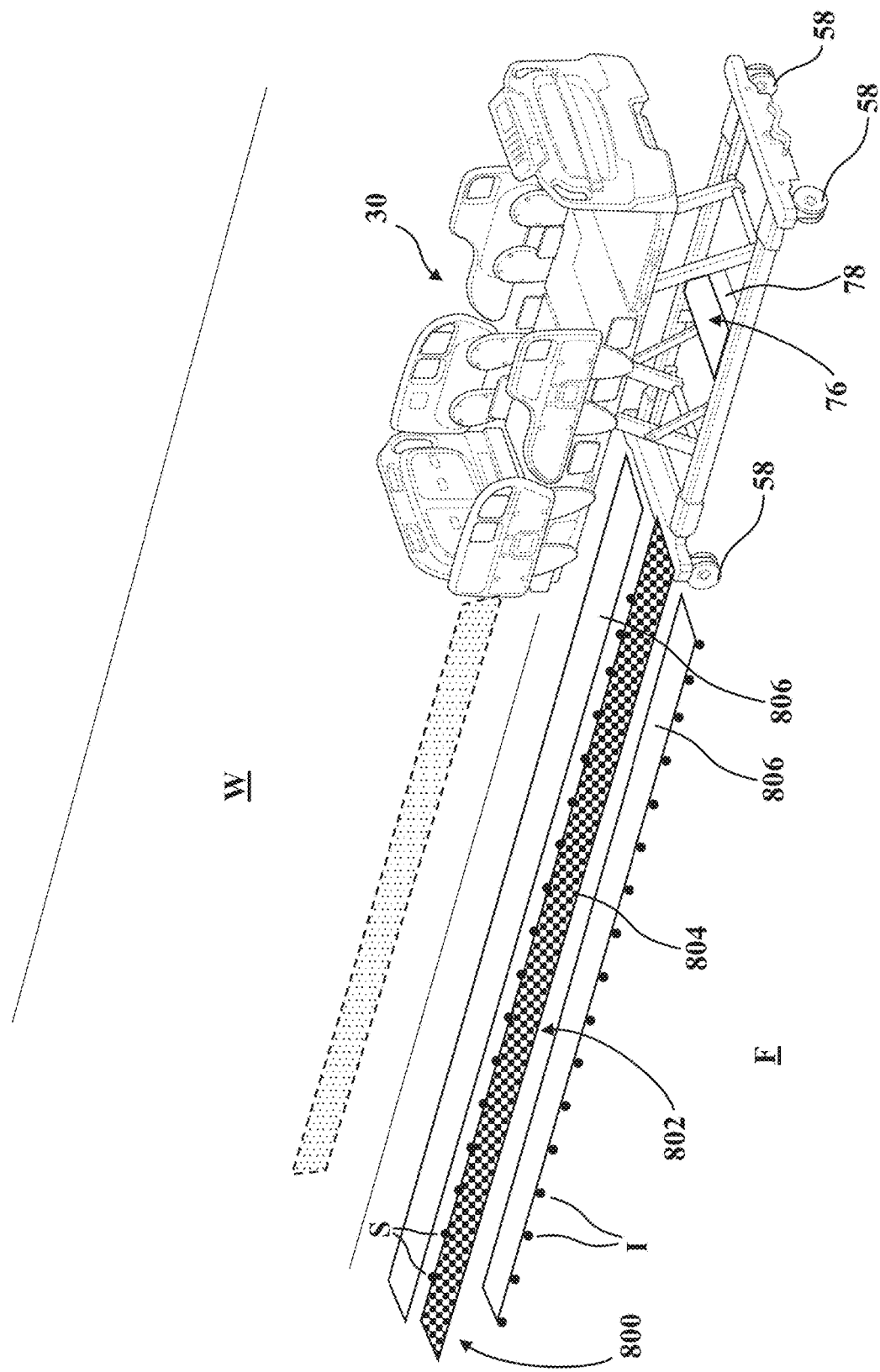
FIG. 24 is a perspective view of an alternative power transfer device comprising a charging lane located on the floor surface.

Referring to FIG. 24, an elongated power transfer device 800 (also referred to as a charging lane) may be provided on the floor surface F (or alternatively on the wall surface W, as shown in hidden lines). The elongated power transfer device 800 comprises either a single continuous power transmitter assembly 802 with a single power transmitter 804 or multiple power transmitter assemblies with multiple power transmitters 804 arranged serially along the floor surface F (or wall surface W). In either case, one or more lane markings 806 (stickers, paint, etc.) delineated on the floor surface F may indicate where the user is to push the patient transport apparatus 30 by indicating, for instance, pathways for the wheels 58 to follow or a centerline along which the patient transport apparatus 30 should be pushed. Separate indicators I could also be attached to the floor surface F adjacent to the lane markings 806 to indicate if power is being transferred, such as LEDs in the floor surface F placed along the lane markings 806. Other locations for the indicators I are also contemplated (e.g., as part of the patient transport apparatus 30, etc.). If the wheels 58 are kept on the wheel pathways or a center of the patient transport apparatus 30 is kept on the centerline, then the power transmitters 804 are able to transfer power to the power receiver 78 on the patient transport apparatus 30. Thus, the markings 806 guide the user to move the patient transport apparatus 30 to the charging area to initiate the transfer of power from the power transmitter 804 to the power receiver 78.

In some cases, sensors S coupled to the power transfer controller 92 are also continuously placed alongside the power transmitter 804 to detect where, along the path, the power receiver 78 is located. As the patient transport apparatus 30 is wheeled along the passageway, portions of the power transmitter 804 (or separate power transmitters 804) that are in a desired proximity of the power receiver 78 (e.g., those for which the power receiver 78 is directly overhead) are selectively activated so that power transfer remains localized to the area of the power transfer device 800 in alignment with the power receiver 78. This helps to avoid energizing the power transmitter(s) 804 in locations where the user steps or where other objects may rest. Such locations are also too remote from the power receiver 78 to enable suitable power transfer.

Figure 25:
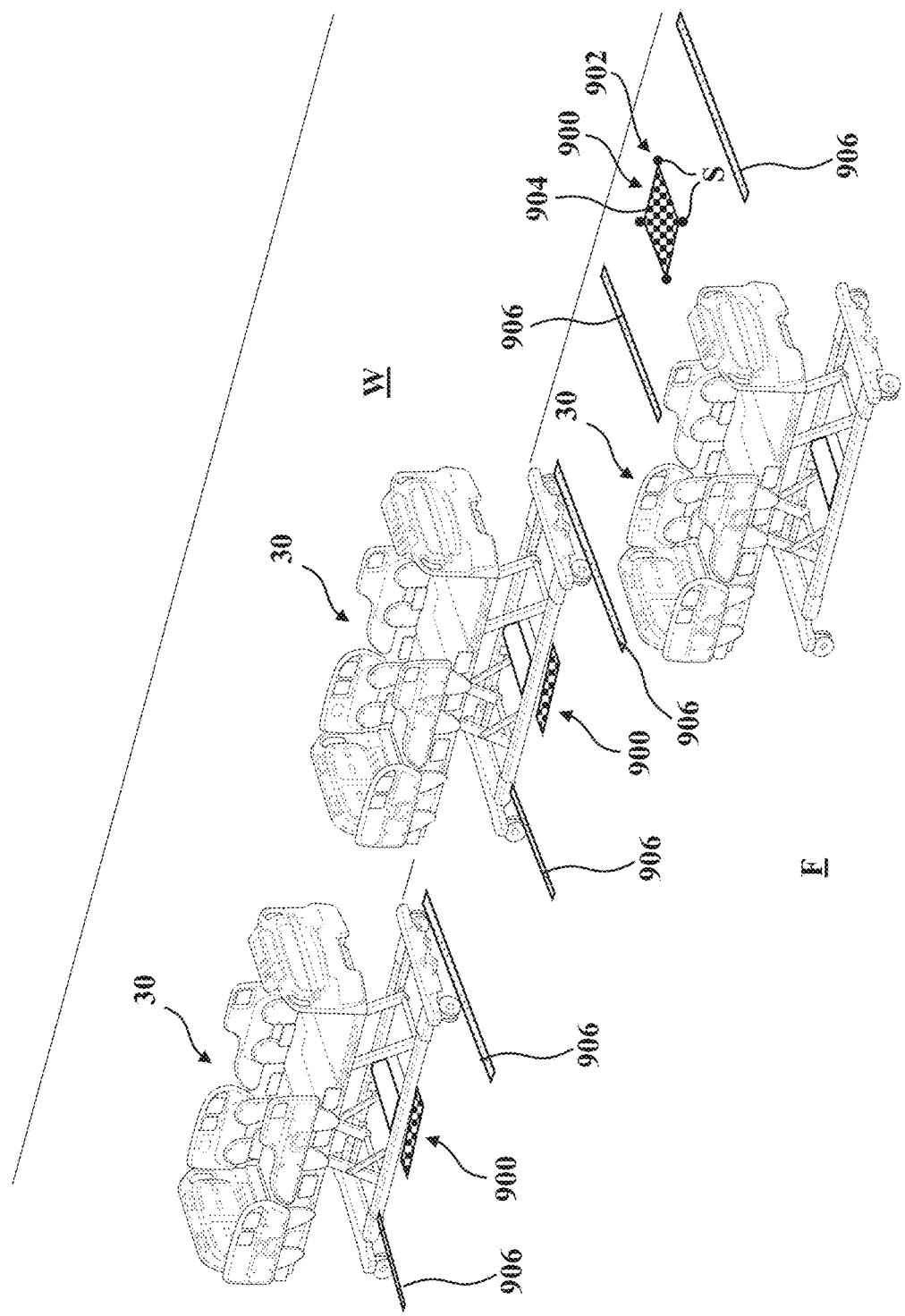
FIG. 25 is a perspective view of a bank of power transfer devices for simultaneously transferring power to multiple patient transport apparatuses.

As shown, in FIG. 25, multiple power transfer devices 900, each having a power transmitter assembly 902 with a power transmitter 904, are provided to transfer power to multiple patient transport apparatuses 30 simultaneously or sequentially. The power transmitters 904 may be placed along the floor surface F or the wall surface W to define a charging location with multiple charging areas. The multiple power transmitters 904 may be located throughout a facility to make connecting the patient transport apparatus 30 to a power source more convenient for users. As shown in FIG. 25, the exemplary power transfer device 900 (could be the same as power transfer device 70) is shown mounted to the floor surface F. Floor markings 906 provide an alignment system to align the patient transport apparatuses 30 with one of the power transmitters 904. The power transmitters 904 may be unpowered until a connection with a power receiver 78 is detected, e.g., as detected by one or more sensors S such as hall-effect sensors, cameras, proximity sensors, or the like. Power may be transferred through inductive coupling as previously described.

Figure 26:
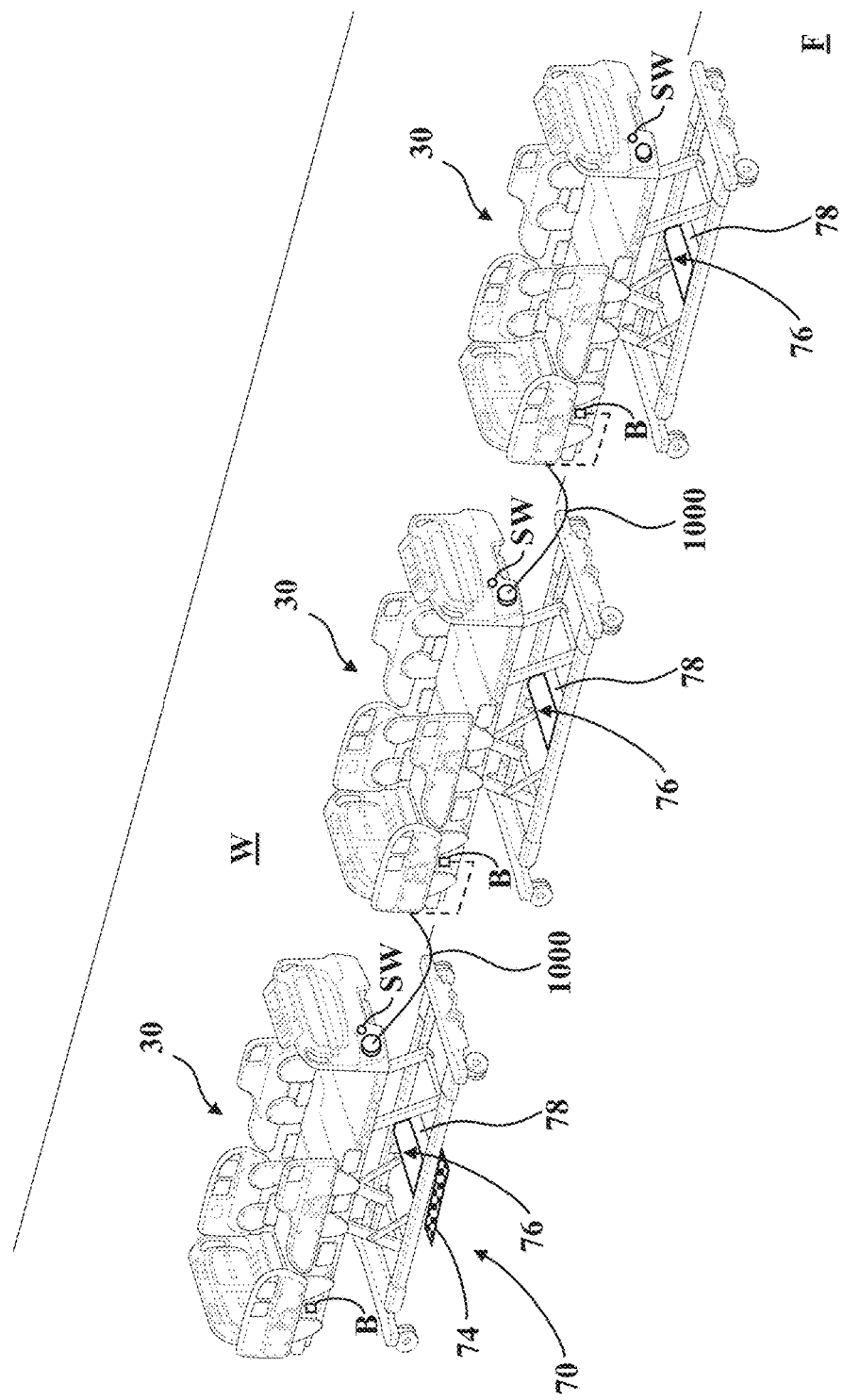
FIG. 26 is a perspective view of a power transfer device transferring power to multiple patient transport apparatuses via daisy-chained connections between the patient transport apparatuses.

Referring to FIG. 26, in one embodiment, a single power transfer device 70 can be used to transfer power to multiple patient transport apparatuses 30 in a daisy-chained manner. In particular, the power transmitter 74 transfers power to a power receiver 78 in the same manner previously described. A second patient transport apparatus 30 is then charged via a charging conduit 1000 interconnecting a second energy storage device B on the second patient transport apparatus 30 to the power receiver 78. Current from the power receiver 78 could be automatically routed to the second energy storage device B once the first energy storage device B on the first patient transport apparatus 30 is full of charge, or a manual switch SW could be activated to transfer charging to the second energy storage device B. Additional patient transport apparatuses 30 could be charged in this manner as shown. Similarly, the coils/windings in the power receiver 78 could initially be configured to generate current in response to the magnetic field created by the power transmitter 74 to receive energy from the power transmitter 74, but the coils/windings in the power receiver 78 could subsequently be configured to act as a power transmitter by the apparatus controller 90 in order to transfer power to the power receiver 78 on the second patient transport apparatus 30.

Figure 27:
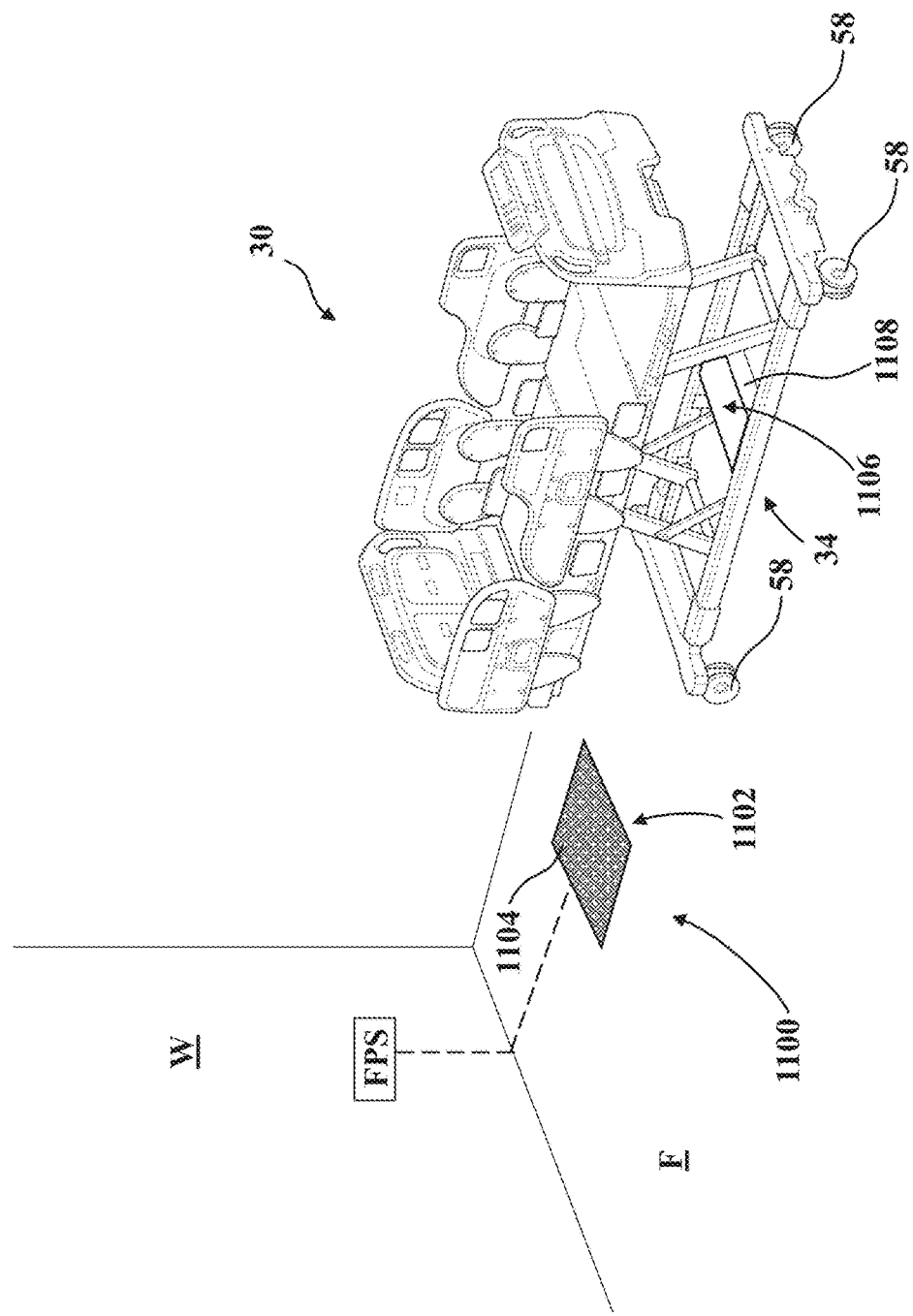
FIG. 27 is a perspective view of an alternative power transfer device comprising a photovoltaic panel.
Figure 28:
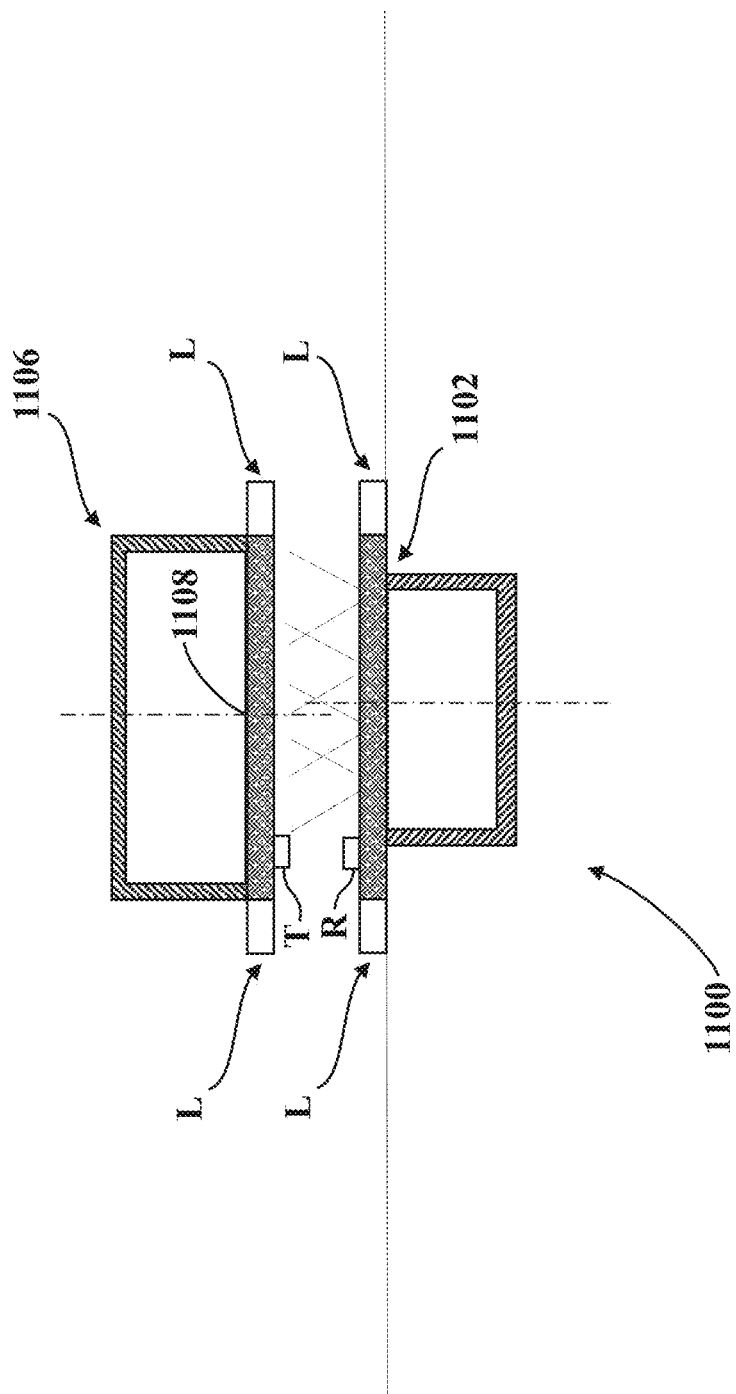
FIG. 28 is a partial sectional view of the photovoltaic panel transferring light energy to a power receiver of a patient transport apparatus.

Referring to FIGS. 27 and 28, an alternative type of power transfer device 1100 is shown comprising a power transmitter assembly 1102 having a power transmitter 1104. The power transmitter 1104 in this embodiment comprises a light energy emitter panel mounted to the floor, wall, or ceiling. The light energy emitter panel may comprise LEDs or other light emitters mounted thereto that are connected to the fixed power source FPS (or other power source) and a controller (such as power transfer controller 92) to be controlled in a suitable manner to transmit light energy. A power receiving assembly 1106 has a power receiver 1108 mounted to the base 34. The power receiver 1108 comprises a photovoltaic receiver panel connected to the powered devices PD and the energy storage device B of the patient transport apparatus 30 in the same manner as the power receivers previously described. The light energy emitter panel can be aligned with the photovoltaic receiver panel in any of the ways previously described herein for aligning power transmitters with power receivers. Moreover, any of the power transmitters and power receivers previously described could instead, or additionally, employ this light energy based arrangement for wirelessly transferring power from the fixed power source FPS to a patient transport apparatus 30.

Photovoltaic cells are one way to transfer energy without using a wired connection to the facility. In this embodiment, the amplitude and frequency of the energy source (e.g., the LEDs) can be tuned with the photovoltaic receiver panel to ensure that energy transfer occurs at a desired rate, such as a maximum rate. Additionally, light from the light energy emitter panel could be in the non-visible spectrum. Additional energy harvesting methods could be used in addition to harvesting light energy. Vibration energy, motion energy, heat energy, and other forms of energy could be captured to complement the other forms described herein and could be similarly directed to the energy storage device B. For instance, motion of the patient transport apparatus 30 could operate a generator (not shown) coupled to one of the wheels 58 to generate energy as the wheel 58 rotates when the user moves the patient transport apparatus 30. The generator feeds energy directly to the energy storage device B.

Figure 29:
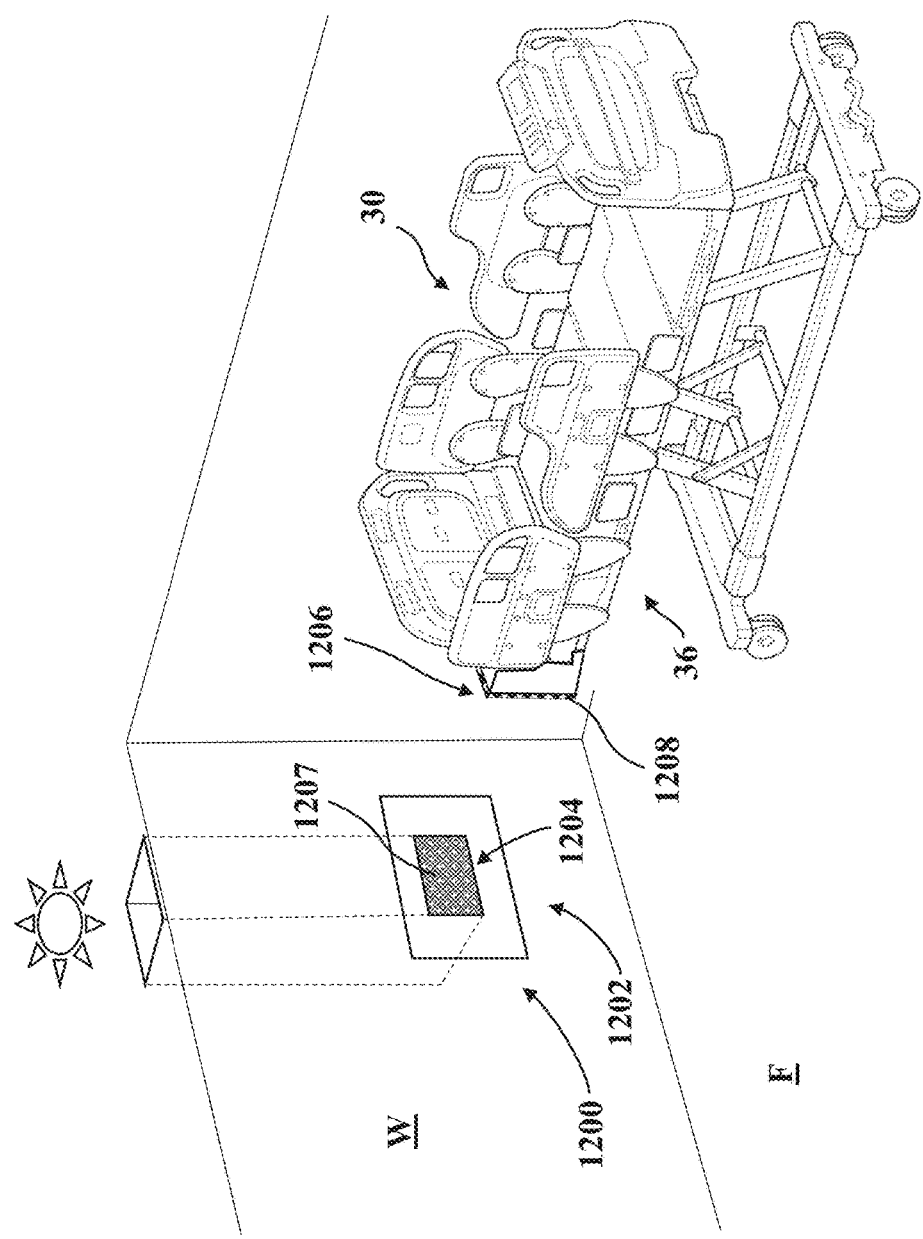
FIG. 29 is a perspective view of an alternative power transfer system comprising an energy surface directing natural light to charge a photovoltaic panel on a patient transport apparatus.
Figure 30:
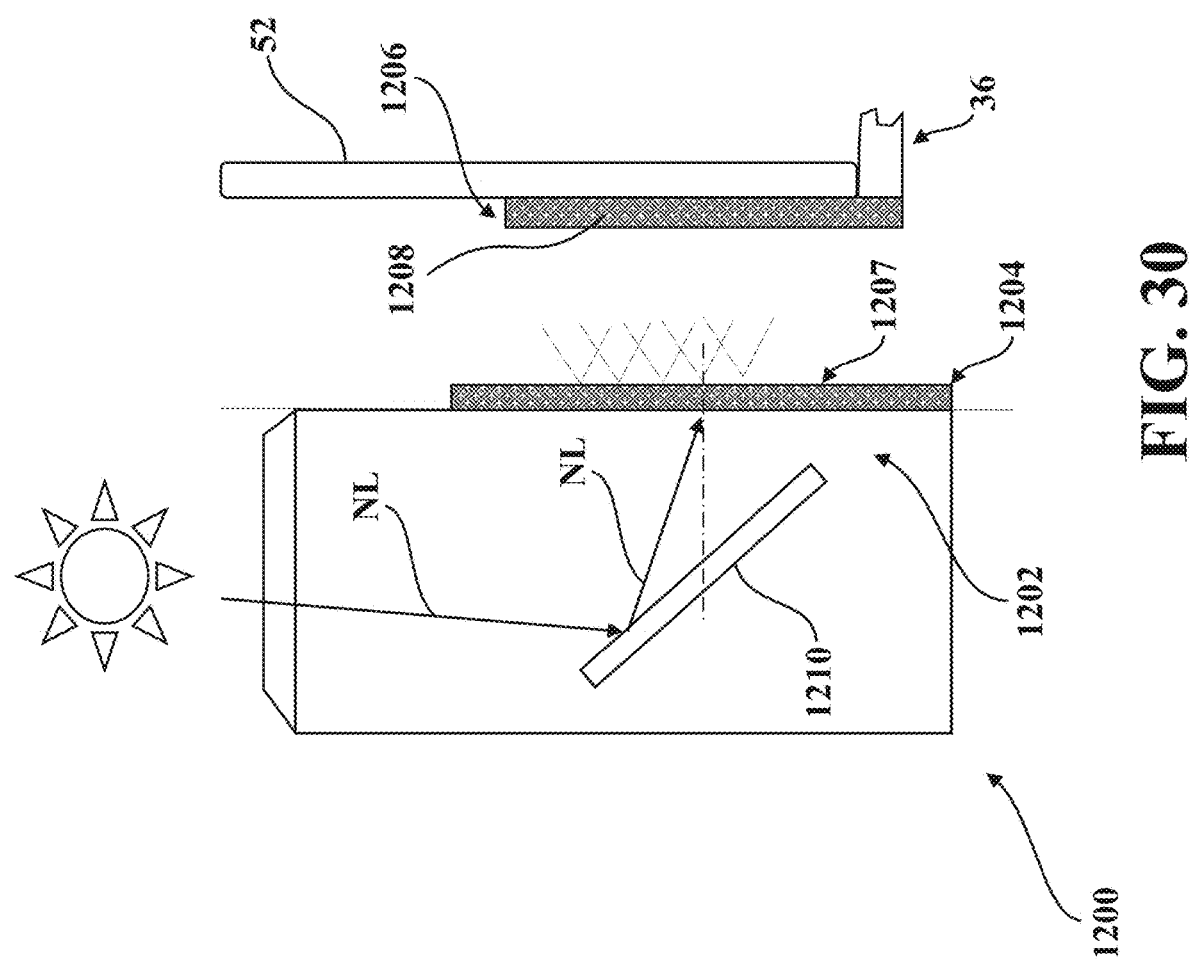
FIG. 30 is an illustration of the natural light directed from the energy surface to the photovoltaic panel on the patient transport apparatus.

Referring to FIG. 29, another power transfer device 1200 is shown comprising a power transmitter assembly 1202 having a power transmitter 1204 in the form of an energy surface 1207 that is configured to deliver natural light to a power receiver assembly 1206 having a power receiver 1208 mounted to the support frame 36. The power receiver 1208 comprises a photovoltaic receiver panel (e.g., solar panel) coupled to the energy storage device B. The energy surface 1207 is configured to deliver natural light, e.g., sunlight, to the photovoltaic receiver panel. Referring to FIG. 30, one or more light directing elements 1210 are arranged to redirect the natural light toward the energy surface 1207 so that the natural light is received by the photovoltaic receiver when the photovoltaic receiver is in a desired proximity to the energy surface 1207. Any of the locators L or other alignment systems previously discussed could be used to provide alignment between the energy surface and the photovoltaic receiver.

As shown in FIG. 30, natural light NL could enter the facility through a skylight, opening in the roof, window, or the like, and be redirected toward the energy surface by one or more of the light directing elements 1210. The light directing elements 1210 may comprise one or more mirrors, lenses, prisms, and the like. The light may be directed to pass generally perpendicularly through the energy surface 1207 to be routed directly to the photovoltaic receiver. The energy surface 1207 may be transparent or at least translucent (e.g., surface of transparent/translucent panel) to allow light to pass through. Alternatively, the energy surface 1207 may form part of a light emitter panel that has photovoltaic cells to convert the natural light NL into light energy, light emitting elements (e.g., LEDs) to emit artificial light from the energy surface 1207, and a controller to control energy storage and transmission. In some embodiments, one or more openings may be present in the energy surface, wherein the natural light is directed through the one or more openings to reach the photovoltaic receiver.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A power transfer system comprising:
   a patient transport apparatus comprising:
      a support structure having a base and a patient support surface for a patient;
      an energy storage device;
      a power receiver coupled to said energy storage device; and
      wheels coupled to said support structure to facilitate transport of said patient transport apparatus over a floor surface and relative to a wall surface;
   a power transfer device comprising a controller and a power transmitter coupled to said controller and configured to deliver power from a power source to said power receiver;
   an alignment system arranged to align said power transmitter and said power receiver when a user moves said patient transport apparatus over the floor surface on said wheels and relative to the wall surface so that said power transmitter is capable of transferring power to said power receiver, wherein said power transmitter is configured to remain fixed from movement during such alignment; and
   a sensor coupled to said controller to determine if said power receiver is aligned with said power transmitter to receive power;
   wherein said power transmitter is configured to contact said power receiver when said power transmitter is aligned with said power receiver and ready to transfer power, said controller being configured to determine that said contact occurred before allowing the transfer of power; and
   wherein said controller is configured to determine a proximity of said power transmitter to said power receiver and allow the transfer of power upon determining that said power transmitter is in a desired proximity.

2. The power transfer system of claim 1, wherein said power transmitter comprises one or more of: a pad configured to be arranged on the wall surface; and a mat configured to be arranged on the floor surface.

3. The power transfer system of claim 2, wherein said power transmitter comprises said mat and said mat has a first width and said patient transport apparatus has a second width between two of said wheels, said second width being substantially the same as said first width so that said two of said wheels straddle said mat when said patient transport apparatus is moved over said mat to align said power receiver and said power transmitter.

4. The power transfer system of claim 2, wherein said power transmitter comprises said mat and said mat has a first width and said patient transport apparatus has a second width between two of said wheels, said first width being at least 50% of said second width.

5. The power transfer system of claim 1, wherein said power transmitter comprises one or more of:
   a coil having a rectangular shape;
   coils arranged in an array, wherein said array comprises a central portion and an outer periphery spaced outwardly therefrom, said coils arranged in said array comprising a first coil type arranged along said outer periphery and a second coil type arranged in said central portion, wherein said power receiver is configured to receive power from one of said coils arranged in said array and said patient transport apparatus comprises a second power receiver to receive power from another of said coils arranged in said array; and
   first and second coils, wherein said controller is configured to transfer power from said first coil to said power receiver according to a first protocol and to transfer power from said second coil to said power receiver according to a second protocol, different than said first protocol, said first and second coils being spaced apart.

6. The power transfer system of claim 1, comprising an obstacle detection system configured to determine if any obstacles will interfere with the transfer of power from said power transmitter to said power receiver and an identification device configured to transmit a unique identifier to said controller to authorize the transfer of power from said power transmitter to said power receiver, wherein said controller is configured to determine said unique identifier to authorize said power receiver before commencing transfer of power from said power transmitter to said power receiver.

7. The power transfer system of claim 1, wherein said alignment system comprises a display to display the current alignment relative to a desired alignment, wherein said alignment system comprises markers associated with one of said power transmitter and said power receiver, said sensor configured to detect said markers to determine the current alignment of said power transmitter and said power receiver.

8. The power transfer system of claim 1, wherein said alignment system comprises markings on one or more of the floor surface and the wall surface to assist the user with aligning said power receiver with said power transmitter.

9. The power transfer system of claim 1, wherein said power transmitter comprises a mat having a floor engaging portion and side portions to define a channel, said floor engaging portion comprising a first transmitter coil and said side portions comprising second and third transmitter coils, wherein said power receiver comprises a receiver coil located to pass into said channel to align with said transmitter coils when moving said patient transport apparatus.

10. The power transfer system of claim 1, wherein said alignment system comprises a charging lane delineated on the floor surface to guide the user to move said patient transport apparatus to said charging lane to initiate the transfer of power from said power transmitter to said power receiver, wherein said power transfer device comprises a plurality of said power transmitters placed along the floor surface in said charging lane, wherein said controller is configured to detect said patient transport apparatus being located in said charging lane to activate said power transmitter to transfer power to said patient transport apparatus.

11. The power transfer system of claim 1, wherein said sensor is configured to determine if power is being transferred from said power transmitter to said power receiver, said controller being configured to determine a quality parameter of power transfer associated with alignment of said power transmitter and said power receiver; and an indicator coupled to said controller and arranged to indicate that power is being transferred from said power transmitter to said power receiver and to indicate said quality parameter, wherein said indicator comprises one or more of a visual indicator, an audible indicator, and a tactile indicator.

12. The power transfer system of claim 1, wherein said sensor is configured to detect a second power receiver located to receive power from said power transmitter, and wherein said controller is configured to adjust a transmission frequency of said power transmitter to transfer power sequentially to said power receivers.

13. The power transfer system of claim 1, wherein said power receiver is selectively operable as a second power transmitter configured to transfer received power to a second power receiver of a second patient transport apparatus so that power is transferred to said power receivers in a daisy-chained manner.

14. The power transfer system of claim 1, wherein said sensor is configured to sense charging activity of said power receiver during power transfer and wherein said controller is configured to analyze signals from said sensor and to modify operational parameters of said power transmitter to account for sensed charging activity of said power receiver.

15. The power transfer system of claim 1, wherein power transfer is configured to occur according to a power transfer frequency and further providing data communication through a harmonic of the power transfer frequency between one or more of the following:

said power transmitter and said power receiver;
said power transmitter and a second power transmitter; and
said power receiver and a second power receiver.

16. The power transfer system of claim 1, wherein said power transmitter comprises an energy emitter and said power receiver comprises a photovoltaic receiver, wherein said controller is configured to tune an amplitude and frequency of said energy emitter with said photovoltaic receiver so that energy transfer occurs at a desired rate.

17. The power transfer system of claim 1, comprising a second energy source resulting from one of vibration, motion, and heat of the patient transport apparatus, wherein said second energy source and said power receiver direct energy into said energy storage device.

\* \* \* \* \*